US011392939B2

(12) United States Patent
Wong et al.

(10) Patent No.: US 11,392,939 B2
(45) Date of Patent: *Jul. 19, 2022

(54) METHODS AND SYSTEMS FOR PROVISIONING MOBILE DEVICES WITH PAYMENT CREDENTIALS

(71) Applicant: Visa International Service Association, San Francisco, CA (US)

(72) Inventors: Erick Wong, Vancouver (CA); Kiushan Pirzadeh, Foster City, CA (US); Oleg Makhotin, Paris (FR); Glenn Powell, Fremont, CA (US); Igor Karpenko, Sunnyvale, CA (US); John Sheets, San Francisco, CA (US); Frederick Liu, Oakland, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 151 days.

This patent is subject to a terminal disclaimer.

(21) Appl. No.: 16/681,656

(22) Filed: Nov. 12, 2019

(65) Prior Publication Data
US 2020/0097960 A1 Mar. 26, 2020

Related U.S. Application Data

(63) Continuation of application No. 14/455,600, filed on Aug. 8, 2014, now Pat. No. 10,510,073.
(Continued)

(51) Int. Cl.
G06Q 20/38 (2012.01)
G06Q 20/32 (2012.01)
(Continued)

(52) U.S. Cl.
CPC ....... *G06Q 20/3821* (2013.01); *G06Q 20/322* (2013.01); *G06Q 20/382* (2013.01);
(Continued)

(58) Field of Classification Search
None
See application file for complete search history.

(56) References Cited

U.S. PATENT DOCUMENTS 5,524,072 A * 6/1996 Labaton ................ G06Q 20/04
705/70
5,613,012 A 3/1997 Hoffman et al.
(Continued)

FOREIGN PATENT DOCUMENTS

AU 2014306259 2/2016
CA 2920661 2/2015
(Continued)

OTHER PUBLICATIONS

Smart Card Alliance, "Proximity Mobile Payments: Leveraging NFC and the Contactless Financial Payments Infrastructure", Sep. 2007 (Year: 2007).*
(Continued)

*Primary Examiner* — Jacob C. Coppola
*Assistant Examiner* — Timothy Paul Sax
(74) *Attorney, Agent, or Firm* — Kilpatrick Townsend & Stockton LLP

(57) ABSTRACT

Embodiments are described that are directed to optimizing the provisioning of payment account credentials to mobile devices utilizing mobile wallets. In some embodiments, one of multiple provisioning schemes may be selectively chosen for payment account credential provisioning based upon a determined risk involved with a particular provisioning request. A low risk provisioning request leads to an immediate provisioning of a payment credential, whereas a pro-
(Continued)

visioning request of high risk results in the provisioning request being denied. In some embodiments, medium risk provisioning requests will cause an additional user authentication to be performed before the payment account provisioning is finalized. The additional user authentication may occur using a separate communication channel than the channel in which the provisioning request was received.

18 Claims, 9 Drawing Sheets

Related U.S. Application Data

(60) Provisional application No. 61/863,878, filed on Aug. 8, 2013, provisional application No. 61/898,428, filed on Oct. 31, 2013, provisional application No. 61/866,514, filed on Aug. 15, 2013, provisional application No. 61/868,487, filed on Aug. 21, 2013, provisional application No. 61/978,172, filed on Apr. 10, 2014, provisional application No. 61/870,153, filed on Aug. 26, 2013.

(51) Int. Cl.
G06Q 20/40 (2012.01)
G06Q 20/36 (2012.01)

(52) U.S. Cl.
CPC ..... *G06Q 20/3829* (2013.01); *G06Q 20/4016* (2013.01); *G06Q 20/3674* (2013.01)

(56) References Cited

U.S. PATENT DOCUMENTS

| | | | |
|---|---|---|---|
| 5,781,438 A | 7/1998 | Lee et al. |
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,496,928 B1 * | 12/2002 | Deo .................. G06F 40/197 713/153 |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |

(56) References Cited

U.S. PATENT DOCUMENTS

| | | |
|---|---|---|
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,203,620 B1* | 12/2015 | Nyström ............... H04L 9/0877 |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 10,140,615 B2 | 11/2018 | Carpenter et al. |
| 11,087,328 B2 | 8/2021 | Carpenter et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0097320 A1* | 5/2005 | Golan ................ G06Q 20/4014 713/166 |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0118620 A1 | 6/2006 | Hosogoe |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0156436 A1 | 7/2007 | Fisher et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0288392 A1* | 12/2007 | Peng ................... G06Q 20/322 705/72 |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |

(56) References Cited

U.S. PATENT DOCUMENTS

| | | |
|---|---|---|
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0037046 A1 | 2/2010 | Ferg et al. |
| 2010/0088237 A1* | 4/2010 | Wankmueller ..... G06Q 30/0601 705/75 |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0211507 A1 | 8/2010 | Aabye et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0143711 A1 | 6/2011 | Hirson et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0243553 A1 | 10/2011 | Russell |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143706 A1 | 6/2012 | Crake et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0018795 A1 | 1/2013 | Kolhatkar et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0080333 A1* | 3/2013 | Kamotskyy .......... H04L 9/3234 705/75 |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1* | 6/2013 | Shablygin ............... G06F 21/33 713/185 |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0171929 A1 | 7/2013 | Adams et al. |
| 2013/0173736 A1 | 7/2013 | Krzeminski et al. |
| 2013/0185167 A1* | 7/2013 | Mestre ................... G06Q 20/20 705/21 |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0197998 A1* | 8/2013 | Buhrmann ......... G06Q 20/4016 705/14.53 |
| 2013/0198071 A1 | 8/2013 | Jurss |
| 2013/0198080 A1 | 8/2013 | Anderson et al. |
| 2013/0200146 A1 | 8/2013 | Moghadam |

(56) References Cited

U.S. PATENT DOCUMENTS

| | | |
|---|---|---|
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1* | 9/2013 | Royyuru ............ G06Q 20/382 705/39 |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1* | 10/2013 | Hruska .............. G06Q 20/40 705/67 |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346222 A1 | 12/2013 | Ran |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1* | 11/2014 | Raj ................ G06Q 20/027 705/44 |
| 2014/0344155 A1 | 11/2014 | Liu et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0052064 A1 | 2/2015 | Karpenko et al. |
| 2015/0058191 A1 | 2/2015 | Khan et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0242857 A1 | 8/2015 | Wilcox et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0078436 A1 | 3/2016 | Tomasofsky et al. |
| 2016/0078444 A1 | 3/2016 | Tomasofsky et al. |
| 2016/0086184 A1 | 3/2016 | Carpenter et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0210628 A1 | 7/2016 | McGuire |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor et al. |
| 2018/0075081 A1 | 3/2018 | Chipman |
| 2018/0268405 A1 | 9/2018 | Lopez |

FOREIGN PATENT DOCUMENTS

| | | |
|---|---|---|
| CN | 101485128 | 7/2009 |
| CN | 102754114 | 10/2012 |
| CN | 103186850 | 7/2013 |
| EP | 2156397 | 2/2010 |
| SG | 10201801086 | 3/2018 |
| WO | 0135304 | 5/2001 |

(56) References Cited

FOREIGN PATENT DOCUMENTS

| WO | 0135304 | 5/2002 |
|---|---|---|
| WO | 2004042536 | 5/2004 |
| WO | 2006113834 | 10/2006 |
| WO | 2009032523 | 3/2009 |
| WO | 2010024509 | 3/2010 |
| WO | 2010078522 | 7/2010 |
| WO | 2012042262 | 4/2012 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |
| WO | 2015021420 | 2/2015 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, USPTO Patent Trial and Appeal Board, IPR 2016-00600, Feb. 17, 2016, 65 pages.
U.S. Appl. No. 14/861,916, Non-Final Office Action dated Mar. 12, 2018, 10 pages.
U.S. Appl. No. 14/861,916, Notice of Allowance dated Jul. 23, 2018, 8 pages.
U.S. Appl. No. 61/738,832, Management of Sensitive Data filed Dec. 18, 2012, 22 pages.
U.S. Appl. No. 61/751,763, Payments Bridge filed Jan. 11, 2013, 64 pages.
U.S. Appl. No. 61/879,632, Systems and Methods for Managing Mobile Cardholder Verification Methods filed Sep. 18, 2013, 24 pages.
U.S. Appl. No. 61/892,407, Issuer Over-The-Air Update Method and System filed Oct. 17, 2013, 28 pages.
U.S. Appl. No. 61/894,749, Methods and Systems for Authentication and Issuance of Tokens in a Secure Environment filed Oct. 23, 2013, 67 pages.
U.S. Appl. No. 61/926,236, Methods and Systems for Provisioning Mobile Devices With Payment Credentials and Payment Token Identifiers filed Jan. 10, 2014, 51 pages.
U.S. Appl. No. 62/000,288, Payment System Canonical Address Format filed May 19, 2014, 58 pages.
U.S. Appl. No. 62/003,717, Mobile Merchant Application, filed May 28, 2014, 58 pages.
U.S. Appl. No. 62/024,426, Secure Transactions Using Mobile Devices filed Jul. 14, 2014, 102 pages.
U.S. Appl. No. 62/037,033, Sharing Payment Token filed Aug. 13, 2014, 36 pages.
U.S. Appl. No. 62/038,174, Customized Payment Gateway filed Aug. 15, 2014, 42 pages.
U.S. Appl. No. 62/042,050, Payment Device Authentication and Authorization System filed Aug. 26, 2014, 120 pages.
U.S. Appl. No. 62/053,736, Completing Transactions Without a User Payment Device filed Sep. 22, 2014, 31 pages.
U.S. Appl. No. 62/054,346, Mirrored Token Vault filed Sep. 23, 2014, 38 pages.
U.S. Appl. No. 62/103,522, Methods and Systems for Wallet Provider Provisioning filed Jan. 14, 2015, 39 pages.
U.S. Appl. No. 62/108,403, Wearables With NFC HCE filed Jan. 27, 2015, 32 pages.
U.S. Appl. No. 62/117,291, Token and Cryptogram Using Transaction Specific Information filed Feb. 17, 2015, 25 pages.
U.S. Appl. No. 62/128,709, Tokenizing Transaction Amounts, filed Mar. 5, 2015, 30 pages.
Australian Application No. 2014306259, First Examination Report dated Nov. 10, 2017, 4 pages.
Australian Application No. 2014306259, Second Examination Report dated May 1, 2018, 5 pages.
Canadian Application No. 2,920,661, Office Action dated Oct. 16, 2017, 4 pages.
Chinese Application No. 201480055432.0, Office Action dated Dec. 25, 2018, 15 pages (10 pages of Original Document and 5 pages of English Translation).
Chinese Application No. 201480055432.0, Decision on Rejection dated Nov. 6, 2019, 15 pages.
International Application No. PCT/US2014/050407, International Preliminary Report on Patentability dated Feb. 18, 2016, 8 pages.
International Application No. PCT/US2014/050407, International Search Report and Written Opinion dated Nov. 20, 2014, 11 pages.
U.S. Appl. No. 16/168,829 , Final Office Action, dated Jan. 19, 2021, 22 pages.
U.S. Appl. No. 16/168,829 , Non-Final Office Action, dated Jul. 15, 2020, 13 pages.
Chang , "A Secure Cloud-Based Payment Model for M-Commerce", Institute of Electrical and Electronics Engineers, 42nd International Conference on Parallel Processing, Oct. 2013, pp. 1082-1086.
Application No. CN201480055432.0 , Office Action, dated Nov. 17, 2021, 10 pages.

\* cited by examiner

METHODS AND SYSTEMS FOR PROVISIONING MOBILE DEVICES WITH PAYMENT CREDENTIALS

CROSS-REFERENCE TO RELATED APPLICATIONS

The present application is a continuation application of U.S. application Ser. No. 14/455,600, filed Aug. 8, 2014, which is a non-provisional application of, and claims priority to U.S. Provisional App. No. 61/863,878, filed on Aug. 8, 2013, titled "METHODS AND SYSTEMS FOR PROVISIONING MOBILE DEVICES WITH PAYMENT CREDENTIALS", and U.S. Provisional App. No. 61/898,428, filed on Oct. 31, 2013, titled "METHODS AND SYSTEMS FOR PROVISIONING MOBILE DEVICES WITH PAYMENT CREDENTIALS", and U.S. Provisional App. No. 61/866,514, filed on Aug. 15, 2013, titled "REMOTE MOBILE PAYMENT TRANSACTION WITH MOBILE APPLICATION USING SECURE ELEMENT", and U.S. Provisional App. No. 61/868,487, filed on Aug. 21, 2013, titled "TRANSACTION ALERT SYSTEM INCORPORATING ENCRYPTION", and U.S. Provisional App. No. 61/978,172, filed on Apr. 10, 2014, titled "TRANSACTION ALERT AND TRANSACTION HISTORY DELIVERY SYSTEM INCORPORATING ENCRYPTION", and U.S. Provisional App. No. 61/870,153, filed on Aug. 26, 2013, titled "TRANSACTION LOG PAYMENT APPLICATION", the entire contents of which are herein incorporated by reference for all purposes.

FIELD

Aspects of the disclosure relate to computing technologies. In particular, aspects of the disclosure relate to device provisioning technologies, such as systems, methods, apparatuses, and computer-readable media for provisioning mobile devices with payment credentials.

BACKGROUND

With the continuing development and use of mobile technology, more and more features are being integrated into mobile devices. For example, global positioning system (GPS) applications, mobile office products, messaging systems, video cameras, and even compass functionalities have been incorporated into mobile devices, which has led to their widespread adoption in both business and personal contexts.

To further utilize mobile technology to better cater to a user's daily needs, some attempts have been made to utilize technology enabled by mobile devices to replace conventional physical wallets. For example, one way to provide mobile wallet functionality has been realized by provisioning a card issuer's account information directly onto a secure element (SE) of a mobile device that may be equipped with Near Field Communication (NFC) chipset. A SE may be a smart card chip that is capable of storing multiple applications and/or account specific information that may not be easily accessed by external parties. NFC technology is commonly used for contactless short-range communications based on radio frequency identification (RFID) standards using magnetic field induction to enable communication between electronic devices. This short-range high frequency wireless communications technology allows devices to exchange data over a short distance (e.g., a few centimeters). Such mobile devices may thus use a mobile wallet application that, like a conventional physical wallet, may "contain" payment cards (e.g., credit cards, debit cards, prepaid cards), member cards, transportation cards, loyalty cards, etc.

To this end, user financial credentials (e.g., a Primary Account Number (PAN) of an account, an expiry date, etc.) may be provisioned onto mobile devices. Once these financial credentials have been provisioned onto the mobile device, an NFC-enabled device may transact with (e.g., transfer information, make payments to) another NFC-enabled device by placing the devices near each other. Additionally, mobile devices with provisioned accounts may also be used to perform transactions with other remote systems (e.g., such as a website of a merchant) using other wireless protocols, such as via a cellular or wireless (e.g., IEEE 802.11) network.

Although the benefits from integrating wallet functionality into mobile devices are significant and still being developed, the prevailing technology still lacks effective and safe processes and means to securely and efficiently provision financial credentials to user devices. Embodiments of the invention address these and other problems, individually and collectively.

BRIEF SUMMARY

Typical payment credential provisioning processes require multiple messages between a third party wallet provider and a provisioning server. Additionally, unnecessary delay is often encountered while user accounts are authenticated during provisioning. Accordingly, there is a need to speed the process for provisioning payment accounts on mobile devices (e.g., on secure elements) and provide more efficient methods for provisioning large numbers of card instances on secure elements. Additionally, there is a need for enhanced authentication services during provisioning processes as some legitimate consumers may have questionable initial authentication results. Accordingly, there is a need for additional authentication processes that do not interrupt or delay the provisioning process.

Embodiments of the present invention are directed at optimizing the provisioning of payment account credentials to mobile devices utilizing mobile wallets. According to some embodiments, a provisioning scheme from multiple provisioning paths may be selectively chosen for payment account credential provisioning based upon a determined risk involved with a particular provisioning request.

In some embodiments, a low risk provisioning request may result in an immediate commencement of provisioning, whereas a high risk provisioning request may result in the provisioning request being denied. In some embodiments, those provisioning requests of medium risk will cause an additional user authentication to be completed before the payment account provisioning is finalized. In some embodiments, the additional user authentication includes communicating with the user via a separate communication channel than a channel in which the provisioning request was received. The communication may include sending the user a one-time password over the second communication channel, which may be a SMS message, email, or HTTP message sent by an issuer to the user.

In some embodiments, a medium risk request will cause payment account credentials to be provisioned to a mobile device in an inactive state that does not allow the payment credentials to be utilized, and upon completion of the authentication process, the provisioned inactive credentials may be activated for use.

According to an embodiment, a method performed by a service provider for provisioning account credentials includes receiving, at a server computer via a first communication channel, a first provisioning request to provision a first payment credential to a first mobile device. The first payment credential is associated with a first account of a first user. A first risk level associated with the first provisioning request is determined. Responsive to the first risk level being within a predetermined risk threshold range, the method includes causing an authentication process to be performed with the first user. Responsive to a successful performance of the authentication process, the first payment credential is provisioned onto the first mobile device. The method further includes receiving, at the server computer via the first communication channel, a second provisioning request to provision a second payment credential to a second mobile device. The second payment credential is associated with a second account of a second user. The method further includes determining a second risk level associated with the second provisioning request, and responsive to the second risk level being below the predetermined risk threshold range, causing the second payment credential to be provisioned onto the second mobile device. In an embodiment, a non-transitory computer readable medium stores instructions that when executed by a processor of a server cause the server to perform this method. In an embodiment, a server computer is described that includes a processor and the described non-transitory computer readable medium. In an embodiment, a payment account credential provisioning system is described that includes this server computer, and one or more of an issuer computer, a wallet provider server computer, and a mobile device.

Embodiments of the present invention are directed at optimizing secure element ("SE") application provisioning on mobile devices with mobile wallets that have a consumer enrollment process. Some embodiments are directed at provisioning card data on a secure element by generating and delivering multiple possible personalization scripts for implementing multiple provisioning outcomes in one communication. Accordingly, an embodiment optimizes secure element application provisioning by providing all possible provisioning scripts to a wallet provider or other payment account manager before card data activation is completed, so that the eventual activation of a provisioned card account on a secure account requires less communication and/or computational resources at the time of activation. Accordingly, card application data may be provisioned on a secure element of a mobile device while only requiring a single provisioning message from a provisioning system, which can minimize the number of messages between a mobile wallet server and a payment processing network service provider.

Thus, embodiments of the invention provide efficient provisioning processes that can selectively provide enhanced authentication of a user in a single, efficient process.

These and other embodiments of the invention are described in further detail below.

DETAILED DESCRIPTION

Figure 1:
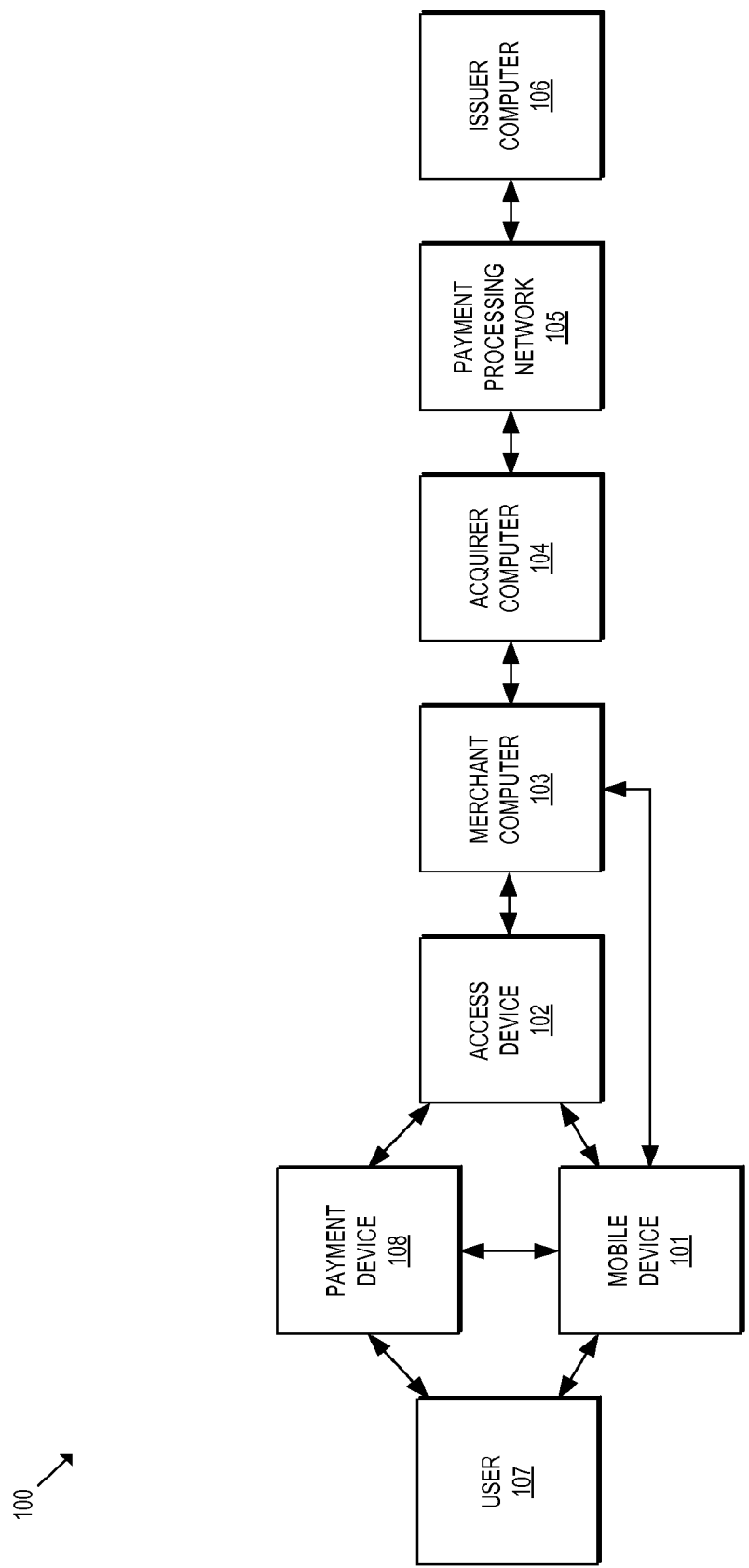
FIG. 1 illustrates a block diagram including entities in a payment transaction system.

Typical payment credential provisioning processes require multiple messages between a third party wallet provider and a provisioning gateway. Additionally, unnecessary delay is often encountered while user accounts are authenticated during provisioning. Accordingly, there is a need to speed the process for provisioning payment accounts on secure elements and providing more efficient methods of provisioning (potentially large numbers of) card instances on secure elements.

Additionally, there is a need for enhanced authentication services during provisioning processes as some legitimate consumers may have questionable initial authentication results. Accordingly, there is a need for additional authentication processes that do not interrupt or delay the provisioning process.

Embodiments of the present invention are directed at optimizing the provisioning of payment account credentials to mobile devices utilizing mobile wallets. According to some embodiments, a provisioning scheme from multiple provisioning paths may be selectively chosen for payment account credential provisioning based upon a determined risk involved with a particular provisioning request.

In some embodiments, a low risk provisioning request may result in an immediate commencement of provisioning, whereas a high risk provisioning request may result in the provisioning request being denied. In some embodiments, those provisioning requests of medium risk will cause an additional user authentication to be completed before the payment account provisioning is finalized. In some embodiments, a medium risk request will cause payment account credentials to be provisioned to a mobile device in an inactive state that does not allow the payment credentials to be utilized, and upon completion of the authentication process, the provisioned inactive credentials may be activated for use.

Embodiments of the present invention are directed at optimizing secure element ("SE") application provisioning on mobile devices with mobile wallets that have a consumer enrollment process. Some embodiments are directed at provisioning card data on a secure element by generating and delivering multiple possible personalization scripts for implementing multiple provisioning outcomes in one communication. Accordingly, an embodiment optimizes secure element application provisioning by providing all possible provisioning scripts to a wallet provider or other payment account manager before card data activation is completed, so that the eventual activation of a provisioned card account on a secure account requires less communication and/or computational resources at the time of activation. Accordingly, card application data may be provisioned on a secure element of a mobile device while only requiring a single provisioning message from a provisioning system, which can minimize the number of messages between a mobile wallet server and a payment processing network service provider.

Thus, embodiments of the invention provide efficient provisioning processes that can selectively provide enhanced authentication of a user in a single, efficient process.

I. Terminology

Prior to discussing embodiments of the invention, a description of some terminology is presented to assist with understanding this disclosure.

As used herein, the term "comprising" is not intended to be limiting, but may be a transitional term synonymous with "including," "containing," or "characterized by." The term "comprising" may thereby be inclusive or open-ended and does not exclude additional, non-recited elements or method steps when used in a claim. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

In the following description and claims, the terms "coupled" and "connected," may be used. The term "coupled" may be used to indicate that two or more elements, which may or may not be in direct physical or electrical contact with each other, co-operate or interact with each other. The term "connected" may be used to indicate the establishment of communication between two or more elements that are coupled with each other.

As used herein, a "mobile device" may comprise any electronic and/or communication device that may be transported and operated by a user, which may also provide remote communication capabilities with resources via one or more networks. Examples of mobile devices include mobile phones (e.g., cellular phones), personal digital assistants (PDAs), tablet computers, laptop computers (e.g., netbooks), personal music players, hand-held electronic reading devices, wearable computing devices, etc.

A "server computer" may be a powerful computer or combination of two or more computers. For example, the server computer can be a large mainframe, a minicomputer cluster, or a group of servers functioning as a unit such as a cluster. In one example, the server computer may be a database server coupled to a web server. Server computers often execute server applications that act as a server in client-server interactions, including but not limited to database server applications, web server applications, application server applications, etc.

As used herein, a "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a Secure Sockets Layer (SSL) session. However, any method of creating a secure channel may be used. By establishing a secure channel, sensitive information related to a payment device (such as account number, Card Verification Value (CVV) values, expiration dates, etc.) may be securely transmitted between the two entities to facilitate a transaction.

As used herein, a "risk score" may include an arbitrary designation or ranking that represents the risk associated that a transaction may be fraudulent. The risk score may be represented by a number (and any scale), a probability, or in any other relevant manner of conveying such information. The risk score may comprise an aggregation of information about a transaction, including transaction information, account information, and verification information as defined above. The risk score may be used by any authorizing entity (such as a merchant or an issuer) in determining whether to approve a transaction. The risk score may comprise and/or utilize both current transaction information and past transaction information, and may weight such information in any suitable manner.

As used herein, a "payment account" (which may be associated with one or more payment devices) may refer to any suitable payment account including a credit card account, a checking account, a prepaid account, etc.

As used herein, "identification information" may include any suitable information associated with an account (e.g., a payment account and/or payment device associated with the account). Such information may be directly related to the account or may be derived from information related to the account. Examples of account information may include a PAN (Primary Account Number or "account number"), user name, expiration date, CVV (Card Verification Value), dCVV (Dynamic Card Verification Value), CVV2 (Card Verification Value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors).

II. Payment Systems

FIG. 1 illustrates a block diagram including entities in a payment transaction system 100. This depicted payment transaction system 100 includes a user 107, a payment device 108, a mobile device 101, an access device 102, a merchant computer 103, an acquirer computer 104, a payment processing network 105, and an issuer computer 106.

The system 100 comprises a user 107 who may operate a mobile device 101. The user 107 may use mobile device 101 to conduct a financial transaction (e.g., a payment transaction) at an access device 102 connected to a merchant computer 103. The user 107 may also use a payment device 108 at the access device 102 to conduct the financial transaction. Merchant computer 103 may be connected to acquirer computer 104. Acquirer computer 104 may be connected to issuer computer 106 via payment processing network 105. Of course, some or all of these entities depicted as connected may be connected across one or more communication networks or may be directly connected.

As used herein, a "merchant" is typically an entity that engages in transactions and may sell goods and/or services. An "issuer" may typically refer to a business entity (e.g., a bank) that maintains financial accounts for users and may issue payment credentials to be stored on a mobile device 101 (e.g., a cellular telephone, smart card, tablet, laptop, etc.) of a user. An "acquirer" is typically a business entity (e.g., a bank) that has a business relationship with a particular merchant or other entity. Some entities can perform both issuer and acquirer functions, and some embodiments may encompass such single entity issuer-acquirers. Each of the entities (e.g., merchant computer 103, acquirer computer 104, payment processing network 105, and issuer computer 106) may comprise one or more computer apparatuses to enable communications or to perform one or more of the functions described herein.

As used herein, a "payment device" 108 may refer to any device that may be used to conduct a financial transaction, such as to provide payment information to a merchant. A payment device may be in any suitable form. For example, suitable payment devices include, but are not limited to, smart cards, magnetic stripe cards, keychain devices (such as the Speedpass™ commercially available from Exxon-Mobil Corp.), cellular phones, personal digital assistants (PDAs), pagers, payment cards, security cards, access cards, smart media, transponders, 2-D barcodes, an electronic or digital wallet, and the like. Such devices can operate in either a contact or contactless mode. In some configurations, a payment device 108 directly interacts with an access device 102 (i.e., without the use of any other device and/or network), but in some configurations payment device 108 communicates with the access device 102 using an intermediary device and/or a communication network. Mobile device 101 is a mobile device (as described above) that may in some embodiments be thought of as a type of payment device (e.g., payment device 108). For example, a mobile device 101 may include, but is not limited to, cellular phones, laptops, tablets, wearable computing devices, etc., and may interact with an access device 102 (e.g., using NFC) and/or merchant computer 103 (e.g., via the Internet to access a website or utilize an application provided by merchant computer 103) to initiate and/or conduct a financial transaction.

The payment processing network 105 may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, digital wallet transactions, and other types of commercial transactions. VisaNet™, in particular, includes a VIP system (Visa Integrated Payments system) that processes authorization requests and a Base II system that performs clearing and settlement services. In some embodiments, payment processing network 105 may conduct transactions in substantially real-time (e.g., in fewer than a few seconds or fractions of a second). The payment processing network 105 may include one or more server computers (as described above). The payment processing network 105 may use any suitable wired or wireless network, including the Internet.

In an exemplary purchase transaction, the user 107 purchases a good or service at from a merchant using a mobile device 101 (e.g., a mobile phone). The user's mobile device 101 can interact with an access device 102 at a merchant associated with merchant computer 103. For example, the user 107 may tap the mobile device 101 against an NFC reader in the access device 102. Alternatively, the user 107 may indicate payment details to the merchant electronically, such using a digital wallet or in through an online transaction. In some purchase transactions the mobile device 101 may not utilize an access device 102, and may directly interact with a merchant computer 103 (e.g., a computing system providing a merchant website or "backend" services for a merchant application 208A executing on the mobile device 101). In these examples, the merchant computer 103 may be thought of as implementing a virtual access device.

To cause the financial transaction to be performed, an authorization request message is generated by the access device 102 (or virtual access device, which may be at merchant computer 103) and is forwarded to the acquirer computer 104. The acquirer computer 104 is a system of an acquirer (as discussed above) providing an account of the merchant, which will ultimately receive the funds for the transaction from an issuer providing the user's 107 account. Such an "authorization request message" may be an electronic message that is sent to a payment processing network 105 and/or an issuer of a payment card (e.g., issuer computer 106) to request authorization for a transaction. An authorization request message, according to some embodiments, may comply with a message type defined by the International Organization for Standardization (ISO) 8583 standard, which is a standard for systems that exchange electronic transaction information associated with payments made by users using a payment device 108 (which could be a mobile device 101) or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also include "transaction information," such as any information associated with a current transaction, such as the transaction amount, merchant identifier, merchant location, etc., as well as any other information that may be utilized in determining whether to identify and/or authorize a transaction. The authorization request message may also include other information, such as an identifier of the access device 102 that generated the authorization request message, information about the location of the access device 102, etc.

Typically, an authorization request message will include a field for a primary account number (PAN) associated with an account of the user 107 that was provided by the mobile device 101 (or payment device 108). After receiving the authorization request message, the acquirer computer 104 will send the authorization request message to the payment processing network 105. The payment processing network 105 then forwards the authorization request message to an issuer computer 106 associated with the issuer of the user's account. The PAN included in the authorization request message may be used by the payment processing network 105 to identify the appropriate issuer computer 106 for the purpose routing or processing (e.g., determining a risk of the authorization request, which may be based upon known rules of the involved issuer) the message.

After the issuer computer 106 receives the authorization request message, the issuer computer 106 sends an authorization response message back to the payment processing network 105 to indicate whether or not the current transaction is authorized. An "authorization response message" may be an electronic message reply to an authorization request message generated by an issuing financial institution or a payment processing network, and may comply with the ISO 8583 standard. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an issuer returns in response to an authorization request message in an electronic message (either directly or through the payment processing network) to the merchant's access device 102 (e.g. POS equipment) that indicates an approval of a transaction, and may serve as proof of authorization.

The payment processing network 105 receives the authorization response message from the issuer computer 106 and transmits the authorization response message back to the acquirer computer 104. The acquirer computer 104 then sends the authorization response message back to the merchant computer 103, where the merchant can determine whether to proceed with the transaction. In some embodiments, such as when a fraud rule is triggered at payment processing network 105, payment processing network 105 may decline a transaction previously authorized by issuer computer 106. After the merchant computer 103 receives the authorization response message, the access device 102 may then provide an authorization response message for the user 107. The response message may be displayed by a display device (e.g., a display device that is part of or coupled to the access device 102), printed out on a receipt, communicated to the user's mobile device 101, etc. Alternately, if the transaction is an online transaction (e.g., via a website or application), the merchant computer 103 may provide a web page, display module, or other indication of the authorization response message to the mobile device 101.

At the end of the day, a normal clearing and settlement process can be conducted by the payment processing network 105. A clearing process is a process of exchanging financial details between and acquirer and an issuer to facilitate posting to a user's payment account and reconciliation of the user's settlement position. However, it should be noted that embodiments of the invention are not limited to a single settlement process.

III. System for Provisioning Card Credentials Using Pre-Generated Scripts

Figure 2:
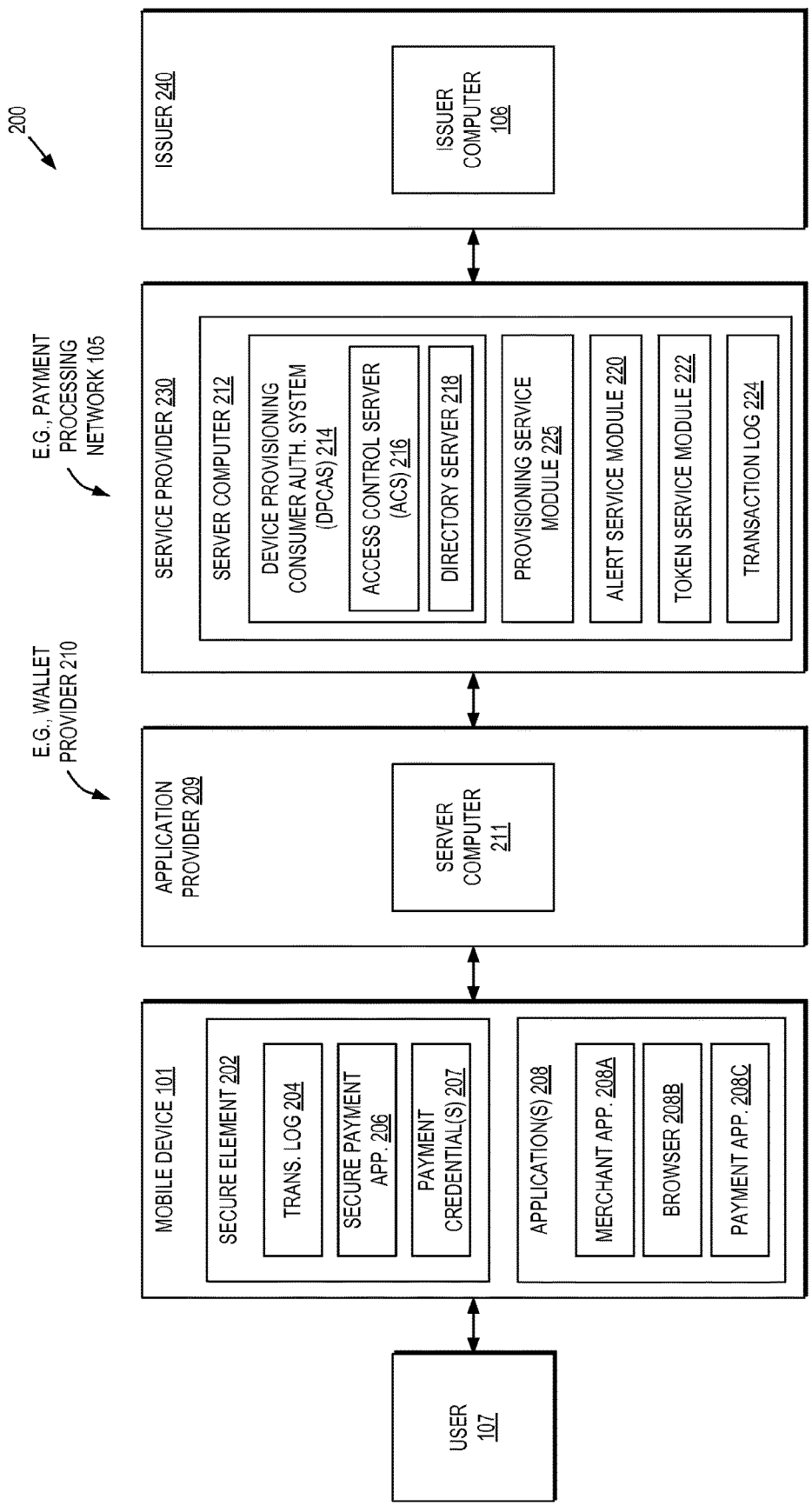
FIG. 2 illustrates a block diagram including entities in an account provisioning system according to some embodiments of the present invention.

In some scenarios, a user 107 with a mobile device 101 may desire to have the mobile device 101 be "provisioned" with payment credentials (e.g., payment credentials 207) to be used with merchants (e.g., with merchant computer 103, typically via an application 208 such as a merchant application 208A, web browser 208B, third-party application, etc.) or for other transactions. The payment credentials 207 may be for an account maintained by an issuer 240. Thus, in some embodiments, mobile device 107 may need to be first provisioned with personalization data, such as payment information and information regarding a user 107. FIG. 2 shows an example of a system 200 that may be used to conduct device provisioning according to some embodiments of the invention. System 200 comprises mobile device 107, an application provider 209 (e.g., a wallet provider 210) server computer 211, a service provider 230 (e.g., a payment processing network 105) server computer 212, and an issuer 240 server computer 106. Each of mobile device 101 and server computers 211, 212, and 106 may be implemented using one or more computing devices. In some embodiments, the mobile device 101 includes a secure element 202, which may be where the payment credentials 207 are provisioned to, and may optionally also include a secure payment application 206 and/or a transaction log 204 (both of which may exist at mobile device 101 outside of secure element 202).

Application provider 209 server computer 211 may be a server computer or another computing device operated by or on behalf of an application provider 209. An application provider 209 may be any entity that provides an application (e.g., an application 208) to a user 107. One example of an application provider 209 may be a digital wallet provider 210 (e.g., Visa Checkout™ or Google™ Wallet). The digital wallet provider 210 may maintain digital wallets for users, each digital wallet comprising payment data for one or more payment accounts. An application provider 209 may be associated with an application installed on mobile device 101. For example, a Visa Checkout application on mobile device 101 may be configured to connect to an application provider 209 server computer 211 operated by Visa.

Service provider 230 server computer 212 may be a server computer or another computing device operated by or on behalf of a service provider 230. A service provider 230 may be any entity that provides provisioning or personalization services. For example, a service provider 230 computer may maintain a personalization database (not illustrated herein) with information about users, and may be configured to communicate with one or more issuers 240 to determine personalized payment data for users 107. The service provider 230 server computer 212, via its provisioning service module 225, may provide "provisioning as a service" to one or more application provider 209 server computers 211, wherein the application provider 209 server computer 211 utilizes an application programming interface (API) to communicate with the service provider 230 server computer 212.

The service provider 230—such as a payment processing network 105—may, as part of its server computer(s) 212, provides a provisioning service module 225 and/or a device provisioning consumer authentication system (DPCAS) 214. The DPCAS 214 may operate as an authentication server that provides authentication services, and may include an access control server 216 (e.g., to determine whether an account is eligible for or participates in particular services) and/or a directory server 218 (e.g., that identifies, for an account, the associated issuer 240 and/or ACS 216). In some embodiments, DPCAS 214 may verify user 107 authentication information, such as user-identifying information, one-time passwords, challenge-response information, etc. In other embodiments, parts or all of DPCAS 214 may be associated with (or provided by) an issuer 240 or another entity. For example, in some embodiments, ACS 216 may be provided by issuer 240. In some embodiments, DPCAS 214 is simply configured to determine an appropriate authentication system to be used for authentication, which may be implemented by the service provider 230, an issuer, a wallet provider, or another third party.

Additionally, the service provider 230 may provide additional services, including but not limited to an alert service 220 (e.g., via one or more processes executing at/by server computer 212) that can generate and provide alerts to a user 107 based upon transactions occurring with the user's 107 account. For example, alert service 220 may analyze one or more transactions of an account of user 107 using a set of one or more alert rules that may be configured by the user 107, and if any of the rules have conditions that are met (i.e., one or more rules are "triggered"), the alert service 220 may provide an alert message to the user 107 indicating and/or describing the triggering of the rules. As one example, a user 107 may configure a rule to be triggered (and thus, an alert message to be provided) when any transactions occur on their account having a value exceeding a defined threshold value. The service provider 230 may also provide a token service 222 that can generate and/or store a "token" (e.g., a first data value) that is associated with another, potentially sensitive second data value. For example, token service 222, may generate a token value for a Primary Account Number (PAN) of an account, and provide the token value while keeping a stored association (or mapping) between the token value and the PAN, such that only the token service 222 (or a limited set of entities) is able to "translate" the token value back to the actual PAN, providing enhanced security. Additionally, server computer 212—such as when it is operated by a payment processing network 105, may maintain/store a transaction log 224 of financial transactions that it processes.

In some embodiments, issuer computer 106 may provide to service provider 230 server computer 212 personal information regarding users 107 associated with issuer computer 106. For example, issuer computer 106 may provide payment information, user information, account information, etc. In some embodiments, service provider 230 server computer 212 may provide to issuer computer 106 data relating to the provisioning process. For example, if during a provisioning process a payment token was generated for a user's 107 account (e.g., by token service 222), this payment token may be provided to the account's issuer 240 by service provider 230 server computer 212.

Thus, in one use case of system 200, a user 107 may operate mobile device 101 to initiate a request for provisioning of a mobile application (e.g., a digital wallet application, which can be payment application 208C and/or secure payment application 206). The request for provisioning may be sent to application provider 209 server computer 211. Application provider 209 server computer 211 may forward the request to service provider 230 server computer 212, and in particular, to provisioning service module 225. The provisioning service module 225 may generate provisioning scripts (e.g., one or more of a partial personalization script, an activation script, a deletion script, etc.) using personalization data determined from issuer computer 106 and/or one or more databases, and transmit these scripts to application provider 209 server computer 211. Application provider 209 server computer 211 may then initiate execution one or more of the scripts at mobile device 101. For example, application provider 209 server computer 211 may cause a partial personalization script to be executed by mobile device 101. At a same or different time, service provider 230 server computer 212 (e.g., provisioning service module 225) may authenticate the user, perhaps using its DPCAS 214. Once the partial provisioning script has been executed and the user 107 has been authenticated, provisioning service module 225 may instruct application provider 209 server computer 211 to cause an activation script to be executed on mobile device 101 to complete a provisioning, thereby completely an "installation" of a set of payment credentials 207 onto the mobile device 101 for use.

In various embodiments, the authentication processes are selectively utilized to avoid their use when additional authentication is not necessary but to efficiently incorporate them when additional authentication is helpful.

It should be noted that any of server computers 211, 212, and/or 106 may be operated by or otherwise associated with a same or different entity. For example, in one embodiment, server computer 212 may be operated by payment processing network 105, and in some embodiments, the DPCAS 214 may be operated by a third-party entity not illustrated herein or by issuer 240, for example.

A. Payment Credential Provisioning

To assist in understanding the depicted entities of FIG. 2, an exemplary flow for provisioning payment account credentials 207 according to some embodiments is described. A user 107 may send a request for provisioning by use of a mobile application 208 running on mobile device 101. For example, in a payment application 208C (e.g., digital wallet application), the user 107 may request provisioning of an account, credit card, or any other payment credentials for mobile device 101. The request for provisioning message may include device information such as a mobile device 101 identifier, secure element 202 identifier, a secure element key identifier (or key), a user identifier (to identify a user or account), and user authentication information (e.g., a cryptogram such as a CVV2 for card verification based authentication processes, a ZIP code for geographic verification, etc.). The application provider 209 server computer 211 receives the request for provisioning message, and may perform a risk check or risk analysis for the requesting user 107, account, mobile device 101, or any other data that is present in the received request for provisioning message, or is tied to a user's account associated with the request for provisioning message. For example, the risk check may involve determining how many times the user's account has been provisioned and how many accounts are provisioned on mobile device 101. The risk check may, for example, indicate the likelihood that the request for provisioning is fraudulent. If the risk check indicates that the risk of provisioning is acceptable, then application provider 209 server computer 211 may send the request for provisioning to provisioning service module 225 executing at service provider 230 server computer 212. The request for provisioning message may include any of the information included in the message received from mobile device 101, and may include additional information determined by application provider 209 server computer 211, such as a primary account number (PAN) associated with the user's account and a reference number associated with the request for provisioning.

The provisioning service module 225 may then attempt to verify the provided user authentication information. For example, if the request for provisioning included a PAN and a cryptogram, provisioning service module 225 may retrieve a master encryption key, use the master encryption key to decrypt the cryptogram, and ensure that the decrypted value is an expected value (e.g., corresponding to received value of the PAN). The provisioning service module 225 may then generate a payment token to provision onto the mobile device using token service 222. The payment token represents a PAN or other account number to be provisioned on the mobile device, and may comprise the actual PAN provided in the provisioning request, a generated token, the PAN together with a PAN sequence number, or another item of payment information to identify the account when used through the mobile payment application 208C. The payment token may be included in the personalization data later stored onto the mobile device 101.

The provisioning service module 225 may then generate a partial personalization script, an activation script, and a deletion script, and send these "provisioning scripts" to application provider 209 server computer 211 in a provisioning script message. The partial personalization script (or "perso" script) may be operable to store personalization data onto mobile device 101, the activation script may be operable to activate or enable access to the personalization data, and the deletion script may be operable to delete or otherwise remove the personalization data from mobile device 101. The provisioning script message may also include device information (which may allow application provider 209 server computer 211 to identify which mobile device 101 is associated with the provisioning scripts), a reference identifier (for a similar purpose), and card art (which may be provided to mobile device 101 as a graphical representation of the account to be provisioned). In some embodiments, the provisioning scripts may be encrypted such that only mobile device 101 or the secure element 202 of mobile device 101 may decrypt the scripts. For example, the original request for provisioning sent by the mobile device 101 may include a public key (or a shared key) of the secure element 202 that allows other entities to use this public key to encrypt messages that can in turn only be decrypted by the secure element 202 using a corresponding private key.

When the provisioning script message is received by application provider 209 server computer 211, it may initiate execution of the partial personalization script on mobile device 101. The execution may be initiated by, for example, sending a partial personalization script message to mobile device 101 that comprises the partial personalization script and instructions (i.e., a command) to execute the script. Once received, a mobile application 208, secure element 202, or another suitable element in mobile device 101 may cause its processor to execute the partial personalization script.

The mobile device 101 may then send, to application provider 209 server computer 211, a partial personalization confirmation message indicating whether the partial personalization script was successfully installed, which may be forwarded to the provisioning service module 225 of the service provider 230 server computer 212.

At an earlier or later point in time, the provisioning service module 225 may utilize the DPCAS 214 to authenticate the user 107. For example, provisioning service module 225 may send an authentication request message to DPCAS 214. The authentication request message may include user authentication information provided by mobile device 101 or application provider 209 server computer 211, such as a PAN, and may also include a reference identifier and device information. The DPCAS 214 may then conduct a further risk assessment and authentication process and determine whether the user is authenticated and authorized to provision mobile device 101, which may include performing detailed checks such as whether the user's 107 account was previously flagged as compromised or an analysis of past transactions (e.g., using transaction log 224). Thus, DPCAS 214 may determine that the user 107 is authenticated, not authenticated, or may seek additional information from the user 107. For example, DPCAS 214 may cause an authentication request message to be sent to mobile device 101 requesting additional user authentication data, and then receive an authentication response message in return. Some examples of additional user authentication information may include answers to a challenge question, security question, a one-time password, etc. Eventually, the DPCAS 214 may provide an authentication response message back to the provisioning service module 225 to indicate a result of the authentication.

When provisioning service module 225, for example, has determined that it has received a partial personalization confirmation message and that it has made an authentication decision, the provisioning service module 225 may send an activation message or a deletion message to application provider 209 server computer 211. For example, provisioning service module 225 may send an activation message if the partial personalization confirmation message indicated a successful execution of the script and the authentication result indicates a successful authentication of the user. Similarly, provisioning service module 225 may send a deletion message if either the partial personalization confirmation message or authentication result indicates a failure. The application provider 209 server computer 211, then, may initiate the execution of the activation script or the deletion script by the mobile device 101, depending on whether an activation message or deletion message was received, respectively. The initiation of the execution of the activation script/deletion script may be performed in a similar manner to initiation of the partial personalization script, as described above.

Upon the execution of the script, the mobile device 101 may then send a provisioning confirmation message to application provider 209 server computer 211 indicating whether the activation or deletion was successfully performed, and this message may be returned to the provisioning service module 225. With a successful verification that the account has been provisioned and activated on the device, service provider 230 server computer 212 may fully activate the account provisioned on the account by informing issuer computer 106 of the activation. For example, if a payment token was previously generated for the payment account, provisioning service module 225 may send a token linkage message comprising the payment token and the account PAN to issuer computer 106 instructing that the token and PAN to be linked.

IV. Differentiated Risk-Based Authentication for Credential Provisioning

As described earlier, typical account credential provisioning processes require multiple messages between a wallet provider 210 and a provisioning service module 225 (or service provider 230 server computer 212). Additionally, unnecessary delay is often encountered while user accounts are authenticated during provisioning, and thus there is a need to speed the process for provisioning payment accounts on mobile devices (e.g., using secure elements) and providing more efficient ways to provision large numbers of payment accounts on large numbers of mobile devices 101. Additionally, there is a need for enhanced authentication services during provisioning processes, as some legitimate consumers may have questionable initial authentication results, or may not be able to easily use typical authentication schemes. Accordingly, there is a need for additional authentication processes that do not interrupt or delay the provisioning process.

Figure 3:
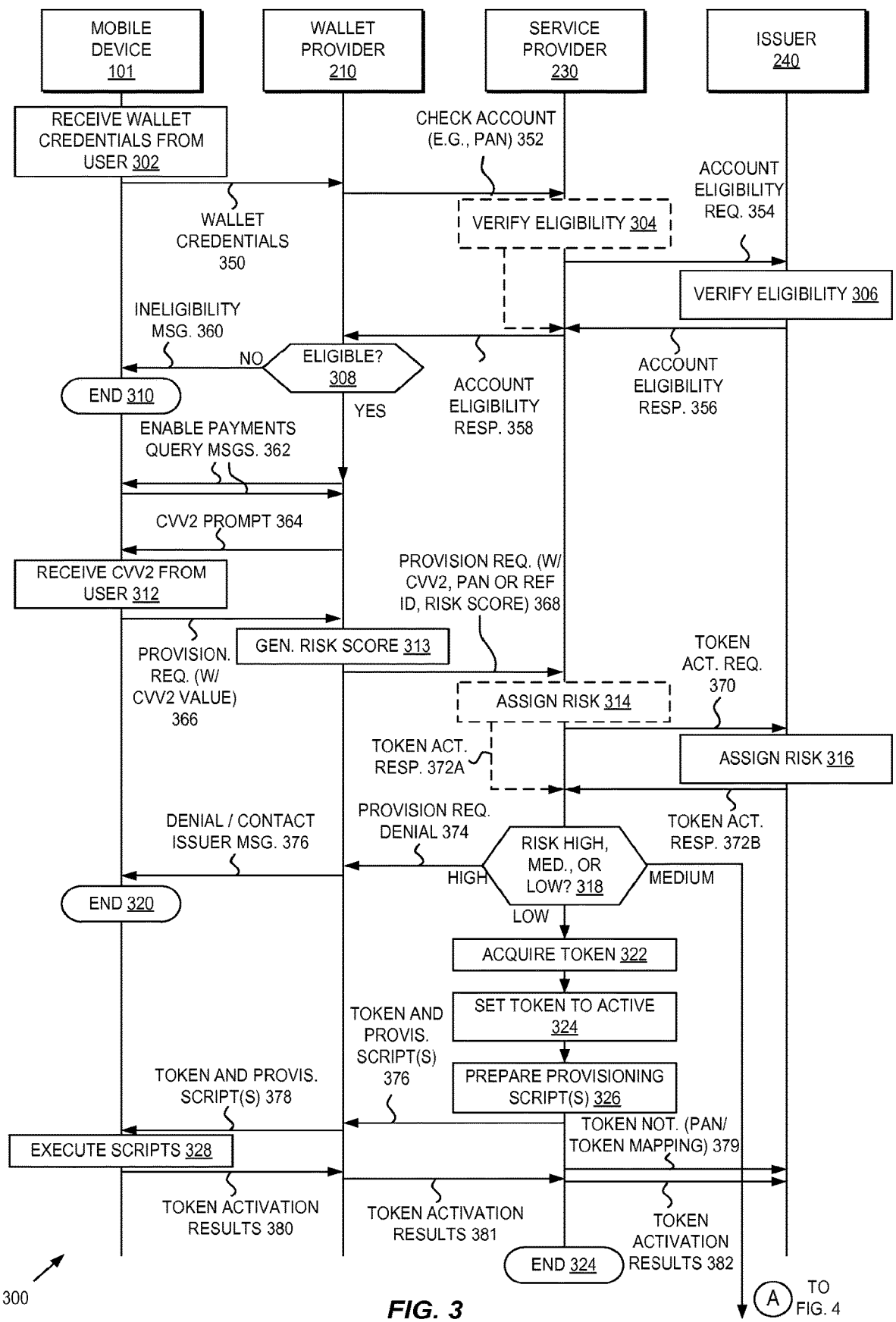
FIG. 3 illustrates a combined sequence and flow diagram depicting account provisioning, including low risk and high risk provisioning, in an account provisioning system according to some embodiments of the present invention.

Embodiments of the invention address these problems, individually and collectively, through in part the use of differentiated risk-based provisioning. FIG. 3 illustrates a combined sequence and flow diagram 300 depicting account provisioning, including low risk and high risk provisioning, in an account provisioning system according to some embodiments of the present invention. As used herein, the terms "account provisioning", "payment account provisioning", "card provisioning", "credential provisioning" and the like may be used interchangeably to refer to the process of putting (or "installing") information associated with the user 107 and/or user account onto a mobile device 101 such that the mobile device 101 can utilize the account for performing a financial transaction, except where it is made clear from the usage of the term and/or its surrounding context that a difference is being referenced.

The depicted sequence and flow diagram 300 depicts messages sent between and actions performed by a set of entities. The set of entities includes a mobile device 101, wallet provider 210, service provider 230, and issuer 240. In some embodiments, one or more computing devices (e.g., server computers) implement each of entities 210, 230, and 240. Thus, the actions and messages presented herein are described with reference to higher-level entities to provide ease of understanding. Additionally, in some embodiments more entities are involved in performing this set of actions, and in some embodiments fewer entities are utilized to perform this set of actions. Accordingly, this representation is merely illustrative of one possible embodiment and is not intended to be exhaustive or limiting.

The depicted process begins when initially user 107 logs into an electronic wallet application (e.g., payment application 208C and/or secure payment application 206) on their mobile device 101 at block 302 to initially request a provisioning of an account, credit card, or any other payment credentials for the mobile device 101.

However, in some embodiments, payment credentials 207 may be installed before the user even tries to activate, use, or otherwise provision the cards to the mobile device. Thus, the process described below may occur automatically without the user knowing. At some point, the user may request that the card credentials be provisioned on the mobile application, and at that time, no further data may need to be sent to the mobile device and the provisioned account may be nearly immediately accessible by the user. Accordingly, embodiments may complete a provisioning process for card credentials before a consumer even requests provisioning of a card instance on a mobile device. For example, a user 107 may download a mobile wallet application on their mobile device 101 and may enter their user name, identifier, cards registered, etc. At that time, the wallet provider 210 may initiate this described process for all of the cards registered with the mobile wallet. Accordingly, embodiments may apply provisioning scripts to user devices before a user even asks to provision a specific card.

However, upon the user 107 providing the wallet credentials to the mobile device 101 at block 302, the mobile device 101 (e.g., at the request of a mobile payment application) transmits the credentials 350 to the wallet provider 210. In the depicted embodiment, upon affirming that the credentials 350 are correct and for a valid account, will transmit a check account message 352 (e.g., make an API call for a card eligibility request) for one or more accounts of the user 107 to the service provider 230. In some embodiments, this check account message 352 includes one or more PANs of accounts of the user (or other types of account identifiers), which may have been provided by the user 107 (e.g., to the wallet provider) at an earlier time, or may have been provided by the user 107 along with the credentials (i.e., at block 302) and sent with the wallet credentials message 350.

The service provider 230, for the PAN (or for one or more of the one or more PANs provided in, identified by, or otherwise associated with the check account message 352) verifies the eligibility of the associated account for which credentials are to be provisioned. In some embodiments, the service provider 230 verifies the eligibility at block 304, but in some embodiments the service provider 230 transmits an account eligibility request message 354 to the issuer 240, and the issuer 240 will then verify the eligibility at block 306 and return an account eligibility response message 356 indicating the eligibility of the account(s). In some embodiments, the account eligibility request message 354 may include a risk value indicating a risk associated with the request, as generated by the service provider 230 or wallet provider 210, which allows the issuer 240 an additional factor to consider when verifying an eligibility of the request.

For example, for a particular PAN, block 304 may include identifying the issuer 240 of the account (e.g., based upon a bank identification number (BIN) of the PAN, for example) and then determining whether that issuer 240 allows for this provisioning to occur. Block 304 may also include utilizing a database of eligible and/or ineligible accounts (e.g., existing in an exception file listing those accounts that have been lost, stolen, or blocked), which may be provided by the issuer 240. In some embodiments, this verification in block 304 may include performing a check digit calculation using the PAN based upon the issuer check digit scheme, determining whether the account has already been provisioned to a device (a same or different device), etc. Similarly, issuer 240 may verify the eligibility of the account at block 306 according to a variety of ways left to configuration preference, such as allowing all accounts to have credentials be provisioned, allowing no accounts to have credentials be provisioned, or allowing only some accounts have credentials be provisioned—which may be based upon an account history, a history of the user's other accounts at the issuer 240, whether the account has previously been provisioned, etc.

At some point, whether via block 304 or block 306, the service provider 230 will have determined the eligibility of the account(s), and will transmit an account eligibility response message 358 (e.g., send an API response message) to the wallet provider 210 identifying one or more accounts and indicating, for these accounts, whether the respective account is eligible for credential provisioning.

At block 308, if an account is not eligible, the wallet provider 210 may transmit an ineligibility message 360 to the mobile device 101, which may cause a message to be presented to the user 107 (e.g., via a display device) to indicate that the account is ineligible. Then, at block 310, the flow ends, and the user 107 may optionally attempt to begin the flow again for a different account.

If, at block 308, an account is eligible, the flow continues with the wallet provider 210 sending an enable payments query message 362 indicating that the account is eligible, and the user 107 and/or wallet application may, in response, cause another enable payments query response message 362 to be sent back to the wallet provider 210 to indicate that the user 107 does seek to "enable" the provisioning of the payment credential 207 associated with the account to the mobile device 101 (i.e., "add" their account to the mobile device 101). The enable payments query message 362 may cause the mobile device 101 to also present a set of terms and conditions to the user during this service activation phase, which the user must accept to continue.

The wallet provider 210 then transmits a CVV2 prompt message 264 to the mobile device 101 seeking the entry of further card information (e.g., a CVV2 or CVV value of a credit card, for example) of the account, which may cause the mobile device 101 to prompt the user 107 for this information. Upon receipt of this card information (e.g., a CVV2 value) from the user 107 at block 312, the mobile device 101 transmits a provision request message 366, which may include the provided card information value (e.g., CVV2 value).

The provisioning request message 366, in some embodiments, includes device information (to identify the mobile device 101 and secure element 202, and may include any unique identifier for the device to identify the secure element keys necessary), consumer identifier or login information/credentials (to identify the user 107), account credentials (e.g., a PAN and/or a card verification value (e.g., CVV2 for card verification based authentication processes)), and/or a zip code (for geographic based authentication processes). The provisioning request message 366 is sent by the mobile device 101 to wallet provider 210, which may generate a risk score (or perform a "risk check" or "risk analysis" to generate risk assessment data) at block 313 based upon the provisioning request message 366. This risk analysis may occur based upon the requesting user 107, account, card, mobile device 101, or any other data that is present in the provisioning request message 366 (e.g., a CVV2 value, ZIP Code, User Identifier, etc.) or is tied to the account of the user 107 submitting the provisioning request (e.g., previously registered/provisioned card data, determining how long the account has been open, how many cards the consumer uses in total or has used, a number of purchases in the past, etc.).

Assuming that the determined risk is not too high, the wallet provider 210 sends a provisioning request 368 to service provider 230 (e.g., provisioning service module 225). The provisioning request may include device information, a primary account number (PAN) associated with the account attempting to be provisioned, an expiration date, a user-entered CVV2 value, a ZIP code, a time-sensitive token (i.e., that can expire if a period of time passes) returned with the account eligibility response message 358, or any other information that may be associated with a user account, and a reference identifier for the provisioning request.

In some embodiments, the provisioning request 352 may include a reference identifier (ID) of the PAN (or token) but not the PAN itself. This reference ID, in some embodiments, is preconfigured (or otherwise agreed upon) by both the wallet provider 210 and the service provider 230 so that both are aware of the mapping (or can otherwise translate) between the reference identifier and the PAN.

In some embodiments, the risk of the request is determined (or "assigned") by the service provider 230 at block 314 (e.g., based upon rules and/or data provided by the issuer 240 at an earlier time) to yield a token activation response 372A. However, in some embodiments the service provider 230 identifies the issuer 240 of the account (e.g., based upon the PAN), transmits a token activation request message 370 (which may include a risk value indicating the service provider assigned risk 314 and/or a risk value generated by the wallet provider 210) to the issuer 240 such that the issuer 240, at block 316, will determine/assign its own risk and return a token activation response message 372B back to the service provider 230.

Similar to the verification of account eligibility described above with respect to blocks 304/306, the assignment of risk at block(s) 314/316 may be performed according to preferences of the implementing entities, and thus can be based upon a variety of factors including, but not limited to, whether the provided CVV2 value exists and is verified as correct, whether an earlier-provided token was included in the provisioning request 352, whether the requested account is already provisioned on the mobile device 101 or another device, if a provided address can be verified as correct, account configuration data provided earlier by the user 107, wallet provider data (e.g., a risk value), device information such as its available hardware or software capabilities, fingerprint or other identifier, etc.

In some embodiments, the service provider 230, after sending the token activation request message 370, may be configured to only wait for the corresponding token activation response message 372B for a period of time. In some of these embodiments, if the period of time expires, the service provider 230 may use its own generated risk assignment 314 outcome (i.e., a token activation response 372A) to continue the flow, and may optionally (not illustrated) transmit another message to the issuer 240 to identify what risk assignment 314 outcome it assigned and/or how the service provider 230 chose to proceed. This embodiment allows the process to continue proceeding an efficient, highly-responsive manner to avoid keeping the user 107 waiting.

Regardless of the exact risk assignment formulation of blocks 314/316, the token activation response message 372A/372B may indicate a level of risk. In some embodiments, at least three levels of risk may be generated, including a "low" risk where the provisioning request is unconditionally approved, a "medium" risk where the provisioning request is conditionally approved, and a "high" risk where the provisioning request is declined. The depicted flow varies based upon which of these levels of risk were generated.

At block 318, the service provider 230 determines which level of risk was determined. As depicted, block 318 indicates identifying whether the level of risk was "High," "Medium," or "Low." Of course, although in some embodiments the levels of risk may be explicitly categorical (and thus uniquely identify which risk category is determined), in other embodiments the levels of risk may be in other formats (e.g., a risk score is generated that is an integer between 0 and 100, for example, and thus the determination of the risk category may include determining if the risk score is within a range of values, meets or exceeds a value, is below a value, etc.).

Figure 4:
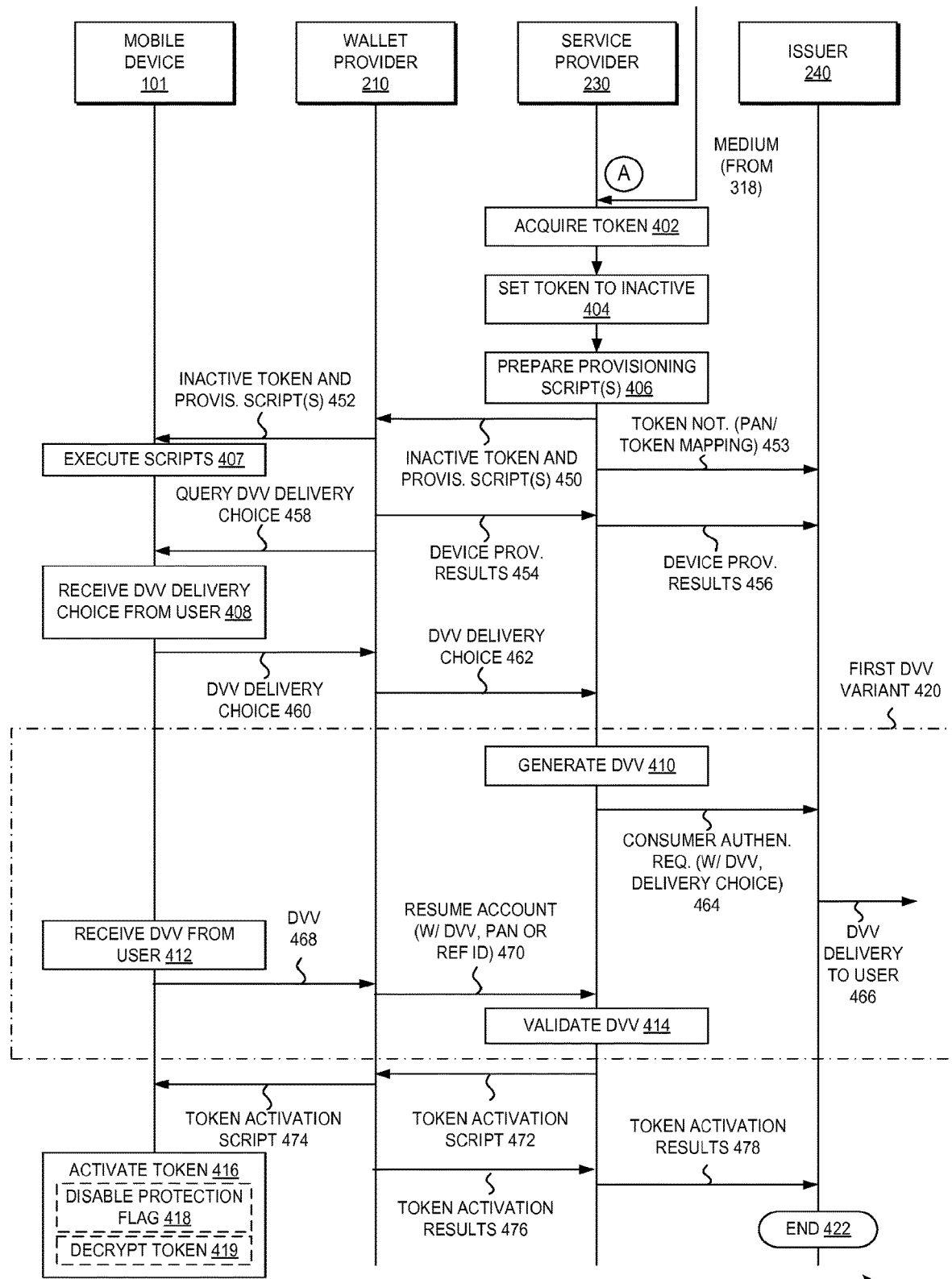
FIG. 4 illustrates a combined sequence and flow diagram depicting medium risk account provisioning in an account provisioning system with respect to FIG. 2 according to some embodiments of the present invention.

FIG. 3 depicts how flow continues for the "high" and "low" risk levels, and FIG. 4 illustrates how flow continues for "medium" risk levels, as indicated by the line leading to the bottom of the page and labeled "TO FIG. 4" next to circle 'A'.

If, at block 318, the risk level is identified as "high," the service provider 230 may transmit a provision request denial message 374 indicating that the provision request message 368 is denied. In response, the wallet provider 210 may transmit a denial message 376 to the mobile device 101, which presents a message to the user 107 indicating the denial and/or instructing the user 107 to contact the issuer of the account (e.g., to ask the issuer to enable the account for account provisioning). At this point, the "high risk" flow ends at block 320.

If, at block 318, the risk level is identified as "low," the service provider 230 may acquire a token 322. In an embodiment, this token acquisition 322 includes the provisioning service module 225 requesting, from token service module 222 (which may be a part of server computer 212—as illustrated—or part of another device), a token for a PAN by sending the PAN to the token service module 222. The token service module 222 may then, using a variety of transformation techniques, generate and return a token, and may store a mapping between the token and the PAN for future translations. For example, in an embodiment, the token may be created with a same size as the PAN (e.g., having a same number of digits), have a same BIN value (or another BIN value within a range of associated BIN values) as the PAN, etc. The token service module 222 (and/or the provisioning service module 225) may store a sequence number (e.g., 0 for a first time token creation for the PAN) of the token, an expiration date of the token (e.g., to be 24 or 36 months from the request date, for example), and set the token to be an "active" token at block 324, perhaps by setting a value within its records, or perhaps may modifying the token value itself.

At block 326, the provisioning service module 225 prepares and sends a message 376 to the wallet provider 210 including the token (received from the token service module 222) along with a set of one or more provisioning scripts. In some embodiments, the this message 376 includes one or more of the token (which may be encrypted), a token expiration date, a portion of the associated PAN (e.g., the last four digits), a portion of the token itself (e.g., the last four unencrypted digits), the associated card metadata, a token reference identifier, a PAN reference identifier, a token to be returned with further messages, and/or the personalization scripts. Then, the wallet provider 210 may forward, in another message 378 back to the mobile device 101, some or all of the information from message 376 (e.g., the provisioning scripts and the token, for example) to cause the token for the account to be provisioned onto the mobile device 101 (by executing the scripts at block 328). In some embodiments, the set of provisioning scripts includes a partial personalization script and an activation script, although in some embodiments the functionality provided by the partial personalization script and the activation script is consolidated into one (or more) scripts.

At block 379, the service provider 230 may transmit a token notification message 379 to the issuer 240 that includes some or all of the information from the message 376, including but not limited to the token, token expiration, a portion or all of the PAN, etc., which serves to notify the issuer 240 of the generated token.

Upon execution of the provisioning scripts received by the mobile device 101 in message 378, the mobile device 101 may return a token activation results message 380 to the wallet provider to confirm and/or deny whether the token (i.e., payment credential 207) was successfully provisioned (i.e., installed). This message 380 may be forwarded on by the wallet provider 210 to the service provider 230 in token activation results message 381, which may further forward the message on as message 382 to the issuer 240. At block 324, the "low" risk flow ends.

Going back to block 318, if the assigned risk value is deemed to be "medium" risk, flow continues to the bottom of the figure and leads to FIG. 4. FIG. 4 illustrates a combined sequence and flow diagram 400 depicting medium risk account provisioning in an account provisioning system with respect to FIG. 2 according to some embodiments of the present invention.

Circle 'A' indicates a beginning to the "medium" risk flow, and the service provider 230 acquires a token at block 402 in a similar manner to the token acquisition described above with respect to block 322 in the "low" risk flow. Accordingly, the service provider 230 may generate a token, retrieve a stored token, or ask another entity for a token (e.g., a third party token provider service). At block 404, the token is set to inactive, which may include modifying the token (e.g., encrypting it), and/or modifying a provisioning script to cause the token to be placed as inactive (i.e., unavailable for payment use by the mobile device 101 for the present time), such as by setting a flag within a memory location of the mobile device 101 (e.g., setting a protection flag within a memory of a secure element 202), etc. At block 406, the service provider 230 prepares one or more provisioning scripts, which in some embodiments includes personalization scripts but not activation scripts.

The provisioning scripts and the inactive token are sent in a message 450 to the wallet provider 210. The message 450 may include some or all of the items as described with respect to message 376 in the "low" risk flow of FIG. 3, and in particular, may include an indicator that the token is inactive and/or that the wallet provider 210 is to acquire a dynamic verification value delivery choice from the user 107 (described later herein). The provisioning scripts and the inactive token are then forwarded on by wallet provider 210 in a message to the mobile device 101, where the scripts are executed at block 407 to cause the inactive token to be installed. Similar to message 379, the service provider 230 may transmit a token notification message 453 to the issuer 240 to inform the issuer 240 of the generated token and its mapping to the PAN.

In some embodiments, the mobile device 101 transmits (not illustrated) a message to the wallet provider 210 to indicate whether the installation of the inactive token was a success, and in response, the wallet provider 210 will transmit a device provisioning results message 454 back to service provider 230, which in turn may forward the device provisioning results message 454 as message 456 back to the issuer 240.

At this point, the wallet provider 210, based upon the indicator that the token is inactive and/or that the wallet provider 210 is to acquire a dynamic verification value delivery choice from the user 107 (from message 450), will send a query message 458 to seek the user's selection as to a preferred way for the user to receive a dynamic verification value (DVV). In some embodiments, this DVV serves as an element of an additional (or "stepped-up") user verification procedure that can be used to increase the confidence that an ultimate provisioning of a credential is proper and thus, is much less likely to be fraudulent. In these examples, a DVV that is a one-time password is discussed; however, many other verification methods may be employed, including but not limited to performing a challenge/response test with the user via mobile device 101 (e.g., based upon information the legitimate user previously provided or is likely to know), having the user call a telephone number (of a customer service center of the issuer, as one example) to pass a set of challenge/response tests, having the user click on a link within an email sent to an email address on file for the user, having the user submit a voice sample or other biometric sample (e.g., fingerprint impression, iris scan, facial image, etc.) for recognition, or another known authentication technique.

As an example, a set of delivery options for the DVV may be presented to the user, including but not limited to receipt through the mobile payment application, receipt of a text message (e.g., Short Message Service (SMS) or other similar messaging service message), placing or receiving a telephone call to acquire the DVV (e.g., to a call center), receipt of the DVV within an email sent to an email address on file for the user, etc. The user 107 may select one of these options and thus the mobile device 101 will receipt the user's selected DVV delivery choice at block 408, and transmit a message 460 including the selected delivery choice to the wallet provider 210, which will forward the delivery choice on in another message 462 (e.g., in a "send OTP" message) to the service provider 230. Further, some or all of the delivery options may include obfuscated information, such as a partially hidden/obscured telephone number (alongside one or more erroneous telephone numbers) or email address, for example.

The service provider 230, in some embodiments, will verify the message 462 by performing one or more of verifying whether a token reference ID passed in the request is valid, whether a token-to-PAN mapping is known to exist, whether that token has previously been provisioned, whether the token is currently in an inactive state, whether a maximum number of OTP code attempts (as allowed by the issuer) has been met or exceeded, etc.

At this point, several configurations exist for generating and/or validating an entry of a DVV. A first DVV variant 420 is illustrated here in FIG. 4, although two other variations are presented later herein in FIG. 6. However, in the first DVV variant 420, the service provider 230 will generate a DVV at block 410, which may include generating a length of random characters/numbers/values. For example, in an embodiment a DVV is a randomly generated four digit number. The generation at block 410 may further include setting an expiration date/time for the generated DVV, and/or setting a "retry count" indicating how many times the user may attempt to provide the DVV, both of which may be sent and/or stored.

In this first variant 420, the service provider 230 transmits a consumer authentication request message 464 (including the user-selected DVV delivery choice and the generated DVV) to the issuer 240. In some embodiments, if the issuer 240 does not respond with a consumer authentication response message within a configured timeout period of time, the service provider 230 may transmit an error message to the wallet provider 210 indicating that the wallet provider 210 should send another message (e.g., message 462) after a particular amount of time.

After receipt of the consumer authentication request message 464, the issuer 240 contacts the user 107 via the selected delivery choice mechanism (see message 466) to provide the user 107 with the generated DVV. Thus, the selected delivery choice mechanism may be thought of utilizing a second "channel" of communication with the user (e.g., via SMS), as opposed to the first "channel" from the user's mobile device 101 through the wallet provider 210 to the service provider 230.

At some point, the DVV is provided to the user 107 according to the selected delivery mechanism, and the user may input the DVV into the mobile device 101 (e.g., via the mobile wallet application), which receives the entry of the DVV at block 412, and transmits the DVV in a DVV message 468 to the wallet provider 210.

At this point, the wallet provider 210 may transmit a Resume Account message 470, which includes the entered-DVV (from message 468) along with an identifier of the respective account (e.g., a PAN, a reference ID, the inactive token, etc.). The service provider 230 may verify the Resume Account message 470 by performing one or more of the following: verifying whether a token reference ID in the message 470 is valid, whether a token-to-PAN mapping is known, whether the token has previously been issued to the wallet provider 210, whether the token is in the inactive state, etc.

At block 414, the service provider 230 then validates the DVV based upon a stored copy of the DVV (from when it was generated in block 410) or by generating a copy of the DVV (e.g., in an embodiment where the DVV is generated based upon a defined and can be re-generated). In some embodiments, the service provider 230 also verifies that the DVV has not expired based upon its submission time and/or verifies the number of user attempts to submit the DVV does not exceed a configured allowable number of attempts.

If, at block 414, the DW is not validated, there are several (not illustrated) options for proceeding depending upon the needs of the system implementer. In some embodiments, one of the DVV variants (e.g., first DVV variant 420) may be performed one or more additional times until the DVV is validated or a number of attempts has been satisfied. In other embodiments, the service provider 230 simply transmits an error code to the wallet provider 210.

However, when (at block 414) the DVV is validated, the service provider 230 may update its records to indicate that the token is now active (e.g., update a status maintained by token service module 222 for the token), and may generate and/or provide an activation script to the wallet provider 210 in message 472, which is forwarded to the mobile device 101 as message 474. The mobile device 101 may then activate the token at block 416 by executing the token activation script, which may cause a protection flag of the token (e.g., within secure element 102) to be disabled (at block 418), or may decrypt the previously-encrypted token (at block 419). In some embodiments, the mobile device 101 reports back to the wallet provider 210 an indicator of whether the token activation was successful (not pictured, and may include an identifier of the account/token and a yes/no or other description of the success or lack thereof of the token activation), and the wallet provider 210 then transmits the token activation results message 476 to the service provider 230, which may forward the results on to the issuer 240. At this point, the "medium" flow terminates at block 422.

Figure 5:
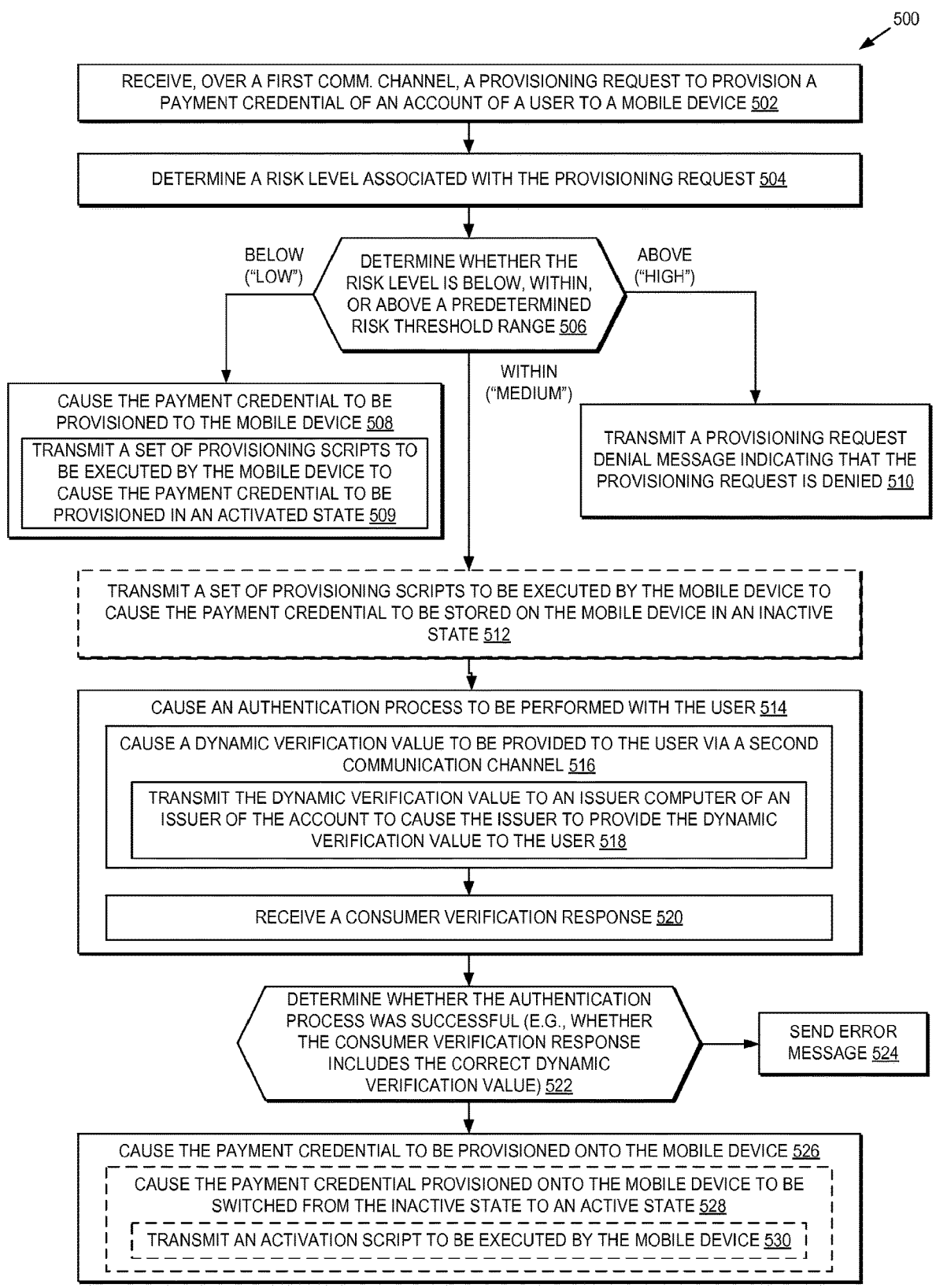
FIG. 5 illustrates a flow in a server computer for account provisioning according to some embodiments of the present invention.

FIG. 5 illustrates a flow 500 in a server computer for account provisioning according to some embodiments of the present invention. In some embodiments, the operations of flow 500 may be performed by a service provider 230 server computer 212, and in some embodiments the operations of flow 500 are performed by provisioning service module 225.

Flow 500 includes, at block 502, receiving, over a first communication channel, a provisioning request to provision a payment credential 207 of an account of a user to a mobile device. The first communication channel may comprise a connection from the service provider 230 server computer 212 to the wallet provider 210. The provisioning request may include a PAN of the account, and in some embodiments may include a reference identifier of the PAN but not the actual PAN itself. The account may be a credit card account, debit card account, checking or savings account, prepaid account, etc. The payment credential 207 may include one or more of an account number of the account, a token associated with the account, an expiration date of the token or account number, personal information associated with the account, a public and/or private key to be used to encrypt and/or decrypt information associated with transactions with the account, card art (e.g., an image such as a depiction of an actual credit card or payment device) for the account, an identifier and/or name of a user associated with the account, an identifier and/or name of an issuer associated with the account, etc.

At block 504, the flow 500 includes determining a risk level associated with the provisioning request. This determination of the risk level may include performing a risk check or risk analysis for the requesting user, account, card, mobile device, or any other data that is present in the received provisioning request (e.g., the CVV2 value, a ZIP Code, a user identifier, etc.) or is tied to the consumer's account associated with the provisioning request (e.g., previously registered/provisioned card data, etc.). The model used for the risk analysis may be configured according to the desires of the operator, and may take into consideration historical information provided by the wallet provider in each request (e.g., how long the account has been opened, how many cards the consumer used, a number or amount of purchases in the past, etc.). The model may also combine payment processing network data regarding spending patterns on the account and network level fraud trends (e.g. data compromise trends, common merchants/categories of spend).

At decision block 506, the flow 500 includes a determination of whether the risk level is below, within, or above a predetermined risk threshold range. In some embodiments, the risk level is set to be "high" (i.e., above the risk threshold range), "medium" (i.e., within the risk threshold range), or "low" (i.e., below the risk threshold range). In some embodiments, the risk threshold range defines a range of values that delineate at least three categories of risk values. For example, in an embodiment where generated risk values are numbers between 0 and 100, the predetermined risk threshold range may be configured as [25, 50], and thus, any generated risk value score that is greater than or equal to 25 and less than or equal to 50 will be considered "medium" risk, and any risk score above that range (i.e., greater than 50) is considered "high" risk, and any risk score below that range (i.e., less than 25) is considered "low" risk. Of course, other predetermined risk threshold ranges may be configured using other ranges/cutoff points, and may be configured according to different types of generated risk scores (e.g., integers, real numbers, letters, etc.) and schemes.

In the depicted embodiment, if the risk level is deemed below the predetermined risk threshold range (i.e., is "low" risk), the flow 500 includes causing, at block 508, the payment credential 207 to be provisioned to the mobile device. In some embodiments, this includes transmitting a set of one or more provisioning scripts to be executed by the mobile device to cause the payment credential 207 to be provisioned in an activated state. In some embodiments, this transmission is made with the wallet provider as the destination, and the wallet provider then forwards on the set of provisioning scripts to the mobile device for execution. In some embodiments, the set of provisioning scripts includes a personalization script including account provisioning data and an activation script that, when executed, causes the provisioned account credential 207 to be provisioned in the active state (i.e., is able to be used by the mobile device for payment transactions). In other embodiments, the set of provisioning scripts includes just one script that provisions the account credential(s).

In the depicted embodiment, if the risk level is deemed to be above the predetermined risk threshold range (i.e., is "high" risk), the flow 500 includes at block 510, transmitting a provisioning request denial message indicating that the provisioning request is denied. In some embodiments, the provisioning request denial message is transmitted to a wallet provider, which then forwards on the provisioning request denial message to the mobile device of the user or otherwise transmits a message to the mobile device to indicate that the provisioning request has been denied.

If, in the depicted embodiment, the risk level is deemed to be within the predetermined risk threshold range (i.e., is "medium" risk), the flow 500 continues with an optional optimization at block 512 of transmitting a set of provisioning scripts to be executed by the mobile device to cause the payment credential 207 to be stored on the mobile device in an inactive state. In some embodiments, the set of provisioning scripts includes a personalization script that, when executed, provisions the payment account credentials 207 in an inactive state that cannot be used by the mobile device. For example, in some embodiments the provisioned token is obfuscated (e.g., encrypted or otherwise transformed) to be invalid, in some embodiments a protection flag is set (e.g., within a mobile device 101 secure element 202) such that the mobile device 101 cannot access the payment credential 207. In some embodiments, the performance of block 512 allows for some credential-provisioning work to be performed "early" (i.e., before a time the credential is actually allowed to be activated), which can distribute the required workload from a time perspective by allowing these potentially relatively computationally expensive steps to be performed early and just using a relatively computationally lightweight script to be executed later on (e.g., at block 530) to activate the pre-provisioned but inactive account credentials. However, in some embodiments this block 512 is not performed, and all payment account credential provisioning occurs later at block 526.

At block 514, the flow 500 includes causing an authentication process to be performed with the user 107. In some embodiments, this authentication process comprises, at block 516, causing a dynamic verification value (DVV) to be provided to the user via a second communication channel. In some embodiments, the second communication channel includes a communication between an issuer 240 of the account with the user 107, and may not include any direct communication between the service provider 230 and the user 107 or between the service provider 230 and wallet provider 210. In some embodiments, this communications channel includes the issuer transmitting an SMS message, an email, placing or receiving a telephone call with the user, transmitting a webpage to the user, etc. In some embodiments, the DVV comprises a one-time password (OTP). The OTP, in some embodiments, is generated by the service provider 230, and in some embodiments is generated by the issuer 240. In some embodiments, the service provider 230 server computer 212 generates (or acquires) the OTP and provides it (at block 518) to the issuer computer 106 managing the user's account for delivery to the user. In some embodiments, the issuer computer 106 generates the OTP and transmits the OTP to both the user 107 (via the second communications channel) as well as to the service provider 230 server computer 212 to enable the server computer 212 to later validate a user's entry of the OTP. However, in some embodiments the issuer computer 106 generates the OTP but does not need to provide the OTP to the service provider 230 server computer 212. For example, issuer computer 106 may generate the OTP according to a determined algorithm so that the OTP can be verified by the service provider 230 server computer 212 based upon the server computer 212 generating the OTP again using the same algorithm, for example. Thus, at some point after the user 107 is provided with the DVV via the second communications channel, the user 107 may provide the DVV back via the mobile device 101. This may cause the mobile device 101 to send the entered DVV to the wallet provider 210, which in turn may generate and transmit a consumer verification response message including the entered DVV to the service provider 230 server computer 212 at block 520.

At block 522, the flow 500 includes determining whether the authentication process was successful. For example, the determining may include a determination of whether the user-entered DVV within the consumer verification response message is the "correct" dynamic verification value. In some embodiments, this determination comprises looking up a stored copy of the DVV (e.g., generated by the service provider 230, issuer 240, or third-party) and comparing it to the received DVV to determine if they are the same. In some embodiments, this determination comprises using a DVV-generation algorithm (e.g., that was previously used to generate the DVV) to generate the DVV and compare the generated DVV to the received user-entered DVV. In some embodiments, when the user-entered DVV within the consumer verification response message is not the same as the "correct" DVV, the authentication process is deemed to have failed, and flow continues at block 524, where an error message is sent. In some embodiments, this message is transmitted to the wallet provider 210 and/or issuer computer 106.

However, in some embodiments when the authentication process is deemed to have succeed (e.g., the user-provided DVV is the same as the "correct" DVV), the flow 500 continues with block 526, which includes causing the payment credential 207 to be provisioned onto the mobile device. In some embodiments, this includes causing the payment credential 207 (previously) provisioned onto the mobile device to be switched from the inactive state to an active state, which may include decrypting/deobfuscating a token of the account, changing a data protection flow (e.g., within a secure element 202), etc. In some embodiments, this provisioning includes at block 530 transmitting an activation script to be executed by the mobile device. In some embodiments, the activation script is sent to wallet provider 210, which in turn provides the activation script to the mobile device 101, causing the activation script to be executed and thus the payment credentials 207 installed/activated. In some embodiments, the service provider 230 server computer 212 also receives a token activation result message 381 from wallet provider 210 indicating whether the provisioning was successful, and may forward this message 382 on to the issuer 240. In some embodiments, the service provider 230 server computer 212 may also transmit a token notification message 379 to the issuer 240 to inform the issuer 240 of the token and the account that it is associated with.

V. Variants for Generating and Verifying Dynamic Verification Values

Figure 6:
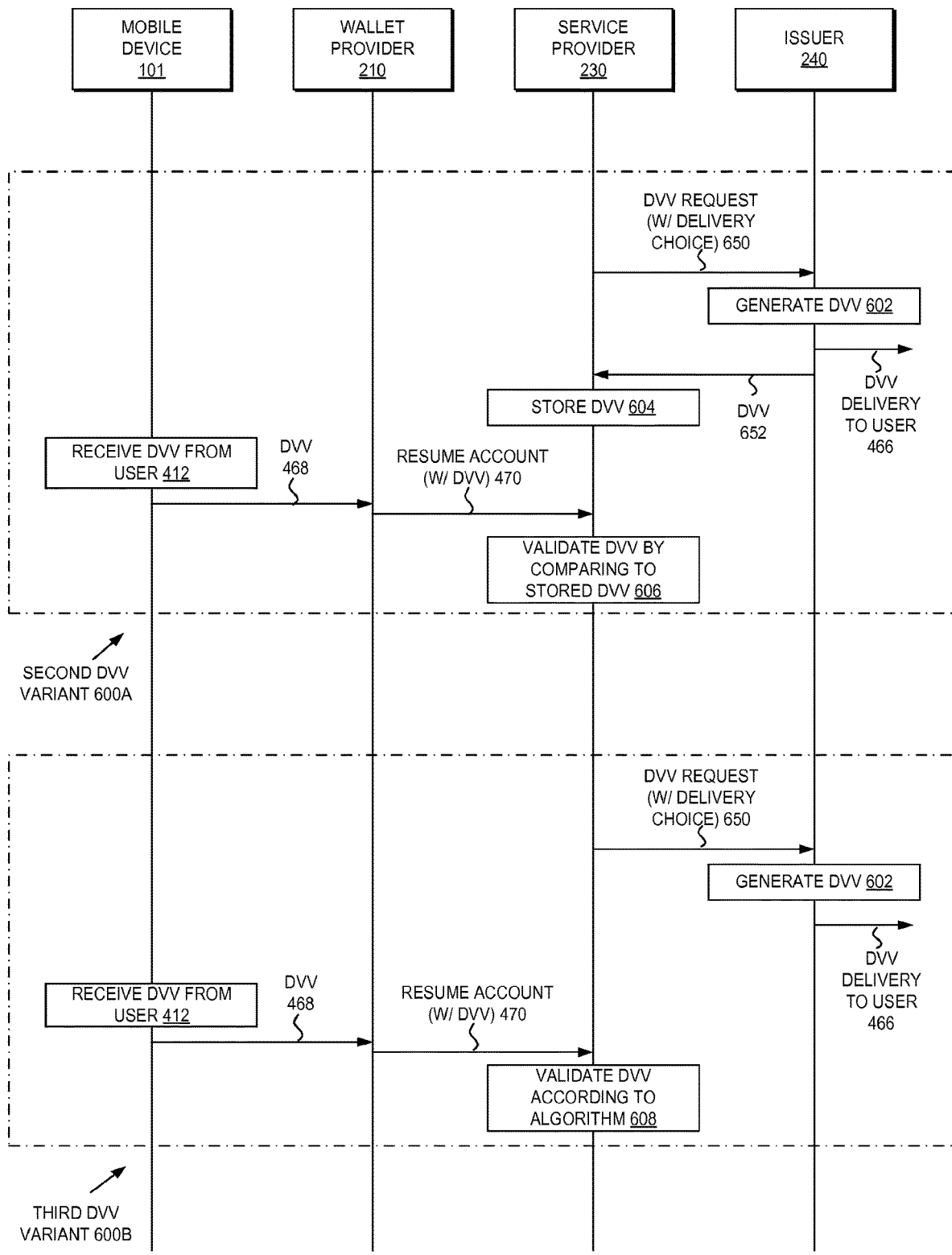
FIG. 6 illustrates a combined sequence and flow diagram depicting two dynamic verification value validation configurations in an account provisioning system according to some embodiments of the present invention.

FIG. 6 illustrates a combined sequence and flow diagram depicting two dynamic verification value validation configurations 600A-600B in an account provisioning system according to some embodiments of the present invention. In some embodiments, the first DVV variant 420 of FIG. 4 is replaced with one of second DVV variant 600A or third DVV variant 600B. However, these are just a few DVV variants possible, and other variants may be utilized that may or may not include features from these variants. Both the second and third DVV variants 600A-600B begin after the service provider 230 server computer 212 has received a DVV delivery choice message 462 from the wallet provider 210.

The second DVV variant 600A includes—instead of generating a DVV as in block 410 of FIG. 4—transmitting a DVV request message 650 (including the delivery choice indicated in the DVV delivery choice message 462) to the issuer 240, which itself will generate the DVV at block 602, provide the DVV to the user at block 466 according to the delivery choice over the second communications channel, and return the generated DVV in message 652 to the service provider 230. The service provider 230 may store this DVV at block 604. After the user has received the DVV over the second communications channel, the user will enter the DVV into the mobile device 101 (e.g., using a mobile wallet application), which will send the entered-DVV in a message 468 to the wallet provider 210. The wallet provider 210 will then transmits a resume account message 470 including the DVV to the service provider 230, which can determine the validity of the authentication by validating the DVV at block 606, which includes comparing the stored DVV (from block 604) with the received user-entered DVV (from message 470). If the values match or are otherwise deemed equivalent, the DVV is validated and thus the authentication succeeds; otherwise, the DVV is not validated and the authentication fails.

The third DVV variant 600B is similar to the second DVV variant 600A aside from a few key differences. First, in the third DVV variant 600B, the issuer 240 does not report the generated DVV back to the service provider (see message 652 of the second DVV variant 600A). Instead, when the service provider 230 receives the resume account message 470 including the user-entered DVV, the service provider 230 may validate the DVV at block 608 according to an algorithm. In some embodiments, the issuer 240 generates the DVV 602 using a particular algorithm that is known to the service provider 230 such that the service provider 230 can either re-generate the DVV itself (using the same algorithm) or invert the algorithm such that it can "undo" the user-provided DVV value to arrive at a clear text value, and then test the clear text value to determine whether it formatted properly. For example, in an embodiment the issuer 240 may generate the DVV 602 by encrypting (with an issuer 240 private key) a clear text value that is based upon a value associated with the user (e.g., a PAN of the account, a user identifier, etc.) and further based upon a current date or time value, for example (of course, many other possibilities exist for creating clear text values, and this provided example is simply illustrative of one possible use case). Thus, the service provider 230 may have access to a public key of the issuer 240, decrypt the user-provided DVV, and determine whether the resulting clear text value includes the correct PAN and a correct date/time value.

VI. Secure Communications Using Consumer-Specific Encryption Keys

Throughout many of the disclosed embodiments, information flows between the user 107 (and mobile device 101) to the service provider 230 or issuer 240 via wallet provider 210. However, consumers have significant privacy concerns and third parties (such as wallet provider 210) may often hold consumer data in transit as it passes from an information source to the consumer. For example, a significant amount of potentially-sensitive financial/transactional data of the user 107 flows through the wallet provider 210. Accordingly, where third party systems may route transaction alerts, transaction history, payment credentials, etc., to consumer devices (e.g., mobile device 101), there is a need for protection of sensitive data.

When the service provider 230 (e.g., payment processing network 105) does not directly communicate with the mobile communication device 101, providing an encryption key to the mobile communication device is a problem because the encryption key is passed through the third party computer (e.g., server computer 211) and the third party computer may gain access and use the key to decrypt future communications. As such, traditional methods of delivering transaction history data to the mobile device 101 via a third party server cannot be implemented to adequately protect the data using a TLS/SSL tunnel since it terminates at the third party server computers, thus giving third party server computers access to data in the clear.

However, by incorporating a unique, consumer-specific key into the provisioning scripts (described earlier with respect to payment credential provisioning) designed to be provisioned onto a user's mobile communication device 101, the encryption key may be protected from interception by the third party because the script may be encrypted with a secure element key associated with a secure memory area on a secure element 202 of the mobile communication device 101. Accordingly, the provisioning scripts are encrypted with keys that the third party computer does not have access to and the embedded consumer-specific key may be provisioned onto the secure element during a personalization process of a mobile payment application with a payment token or other payment credentials of a user. Thereafter, the unique consumer-specific encryption key may be accessed through communications with the mobile payment application on the mobile communication device and used to decrypt encrypted communication information received at the mobile communication device.

Accordingly, embodiments of the invention provide for better security for sensitive data (e.g., transaction alerts, other consumer data, transaction histories, etc.). For example, a third party with a specific consumer base may want to provide transaction alerts for its customers, but it may not be desirable for the third party to be able to view the data in the alert messages as the information could be considered confidential to the user and the third party may not want to have access to the transaction alert data. Embodiments of the invention may incorporate encryption keys at a data source (e.g., the service provider 230/payment processor 105) and at the data destination (e.g., in the end users' mobile devices 101). Thus, sensitive messages may pass from the service provider 230, through the third party computer systems (e.g., wallet provider 210 server computer 211), and to the users' mobile devices 101. The users' mobile devices 101 may include encryption keys so that they may decrypt the sensitive data.

Figure 7:
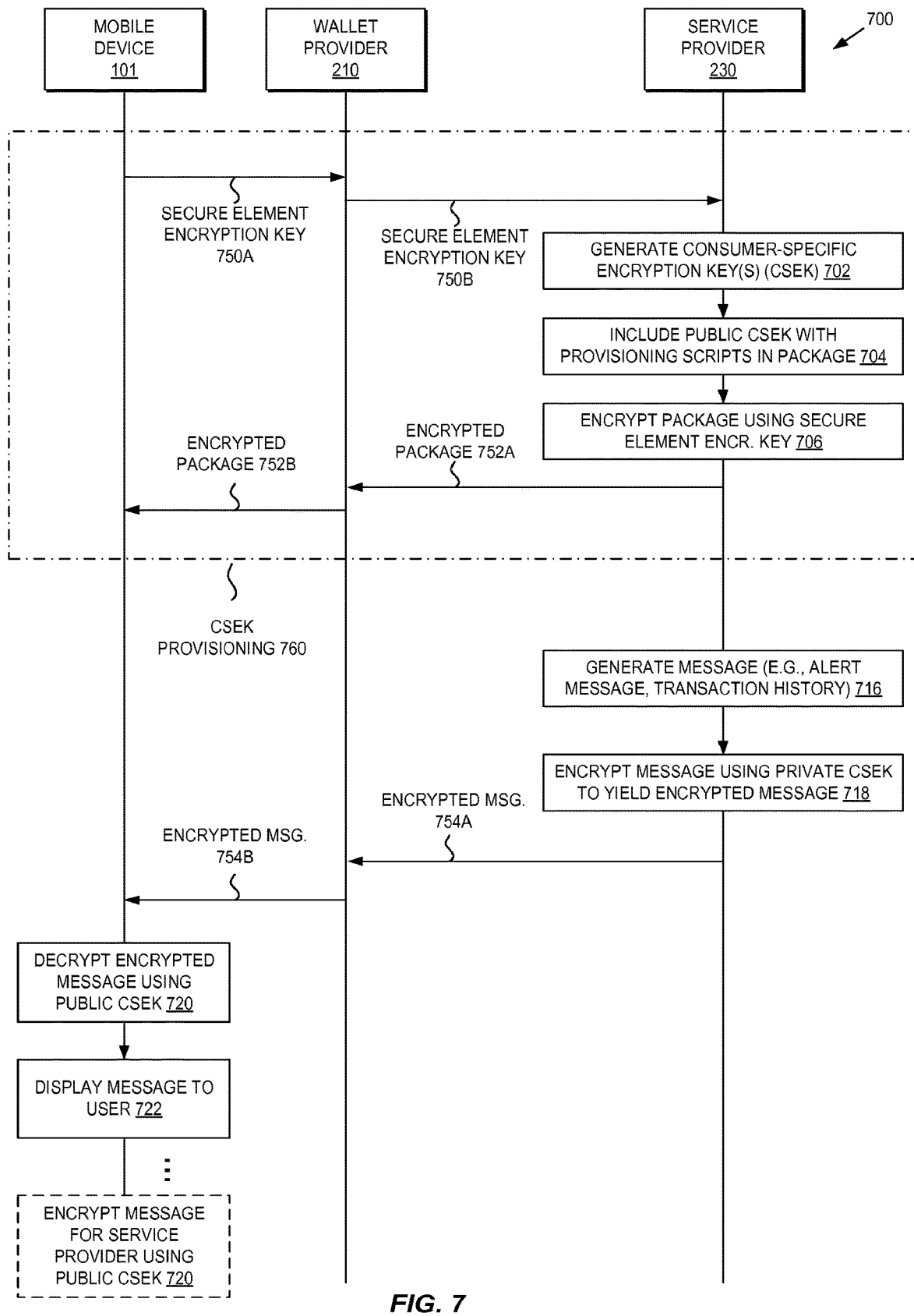
FIG. 7 illustrates a combined sequence and flow diagram depicting consumer-specific encryption key provisioning and the secure message transmission through a wallet provider according to some embodiments of the present invention.

FIG. 7 illustrates a combined sequence and flow diagram 700 depicting consumer-specific encryption key provisioning and the secure message transmission through a wallet provider according to some embodiments of the present invention. In this depicted embodiment, asymmetric cryptography techniques utilizing public/private key pairs are utilized for data protection, although in other embodiments other obfuscation techniques may similarly be utilized.

FIG. 7 illustrates a consumer-specific encryption key (CSEK) provisioning scheme 760 to securely provision the CSEK for use. In this embodiment, the mobile device 101 provides a secure element encryption key (SEEK) in message 750A that may be a public key allowing other entities to encrypt messages that can only be read (i.e., decrypted) by the secure element 202 of the mobile device 101 (e.g., using an associated private key). In other embodiments, this key is not associated with a secure element 202, however, and it is just a public key associated with a private key of the mobile device 101. The wallet provider 210 may forward the SEEK in message 750B to the service provider 230.

At block 702, the service provider 230 may acquire or generate a set of consumer-specific encryption keys. For example, the service provider 230 may generate a public key and a private key to be used for communications with the mobile device 101.

The service provider 230 may then include the public CSEK with the provisioning scripts in a package at block 704, and encrypt this package using the SEEK originally provided by the mobile device 101. Thus, even though this package is routed/forwarded through the wallet provider 210 at messages 752A and 752B (and potentially computing devices of other entities), none of these entities can access the public CSEK or the provisioning scripts in the package, since only the mobile device 101 has the corresponding private SEEK to allow it to "open" the package. Of particular note is that this package (at messages 752A and 752B)—including the public CSEK—may be what is sent when provisioning scripts are generated/sent in any of FIGS. 3 and 4. For example, the preparation of provisioning scripts at block 326 (in "low" risk flow of FIG. 3) may comprise preparing a package that includes the scripts and the public CSEK. Similarly, the preparation of provisioning scripts at block 406 (in "medium" risk flow of FIG. 4) and/or the transmission of the token activation script (see message 472) may similarly comprise sending a public SEEK-encrypted package including the provisioning scripts and/or the public CSEK, for example. Of course, in some embodiments the public-SEEK encrypted package may not include the provisioning scripts (e.g., such as when they do not contain sensitive information) but may include other data such as the public CSEK.

Turning back to FIG. 7, after the CSEK provisioning scheme 760, the service provider 230 and the mobile device 101 are thus enabled, via the use of CSEK keys, to communicate securely without the wallet provider 210 or another entity becoming aware of the transmitted data. For example, at block 716 the service provider 230 may generate a message such as an account alert message (e.g., based upon a financial transaction event violating a configured rule) or a transaction history (e.g., detailing one or more previous transactions for the account of the user) message, for example. This message may then be encrypted, by the service provider 230 at block 718, using the private CSEK to yield an encrypted message. This encrypted message may be sent as message 754A from service provider 230 to wallet provider 210 to mobile device 101 (as message 754B). The mobile device 101 may then decrypt the encrypted message using the public CSEK at block 720, which it may have received in encrypted package 752B that was part of its receipt of the payment credential 207 provisioning scripts. The mobile device 101 may then utilize the message internally, and/or may display the message at block 722 to the user 107. Similarly, at some point in time the mobile device 101 may use the public CSEK at block 720 to encrypt a message for the service provider 230, and then may transmit the message securely toward the service provider 230.

In some embodiments, the encryption and/or decryption may occur at the secure element 202 of the mobile device 101 through a secure mobile payment application 206 that is embedded or installed on the secure element 202 of the mobile device 101. By performing the encryption/decryption at the secure element 202, the encryption keys and information received in the messages may be further protected from malicious third parties that may install malicious software in the general purpose memory of the mobile device 101. Accordingly, more secure implementations of the encryption and decryption processes may be implemented in some embodiments.

VII. Unique Transaction Identifiers

Payment transactions originating from mobile devices 101 provide convenient payment options for consumers but can lead to incomplete and complex transaction processing and reporting issues. For example, mobile devices 101 may only have access to partial transaction data at the time a transaction is initiated and thus, mobile payment applications 208C, 206 located on the mobile device 101 may not have access to a full transaction details but may only have a partial transaction log 204. Additionally, payments initiated by a near-field communication (NFC) chip on a mobile device 101 may lead to a number of unsuccessful payment attempts due to complex radio frequency environments or outdated terminal software and/or hardware. However, when NFC payments are unsuccessful, information stored in a transaction log 204 on the mobile device 101 may not match transaction information stored at different entities (e.g., transaction log 224 at payment processing network 105, merchant 103, acquirer 104, issuer 240, etc.) within a transaction processing system. Accordingly, there is a need for a method for matching transactions received on the back-end of a transaction processing system with those transactions initiated at a mobile device 101. Additionally, there is a need for easily and efficiently identifying unique transactions between the front-end and the back-end of a transaction processing system. Embodiments of the invention address these and other problems, individually and collectively.

One embodiment is directed at a method for generating a unique transaction identifier on a mobile device 101 using a shared digest. The method comprises initiating a payment transaction from the mobile device 101. The method continues by selecting transaction elements associated with the payment transaction according to the shared digest, hashing the selected transaction elements according to a predetermined hashing algorithm, and concatenating the hashed transaction elements. The unique transaction identifier is then stored in a transaction log 204. Another embodiment is directed at a method for matching transactions using a unique transaction identifier. The method comprises receiving an authorization request message for a transaction originating from a mobile device 101 and generating a unique transaction identifier for the transaction. The unique transaction identifier is generated using a shared digest and predetermined transaction elements in the authorization request message. The server computer (e.g., server computer 212) sends transaction matching information including the unique transaction identifier to the mobile device. The mobile device 101 searches a transaction log 204 for the transaction associated with the unique transaction identifier, identifies transaction information associated with the unique transaction identifier, and updates a transaction log with the transaction matching information. Further, other embodiments may be directed at using the transaction identification techniques described herein for a number of different uses including transaction reporting, loyalty program monitoring, and any other uses where matching transaction data between a front-end and back-end system is desirable.

Figure 8:
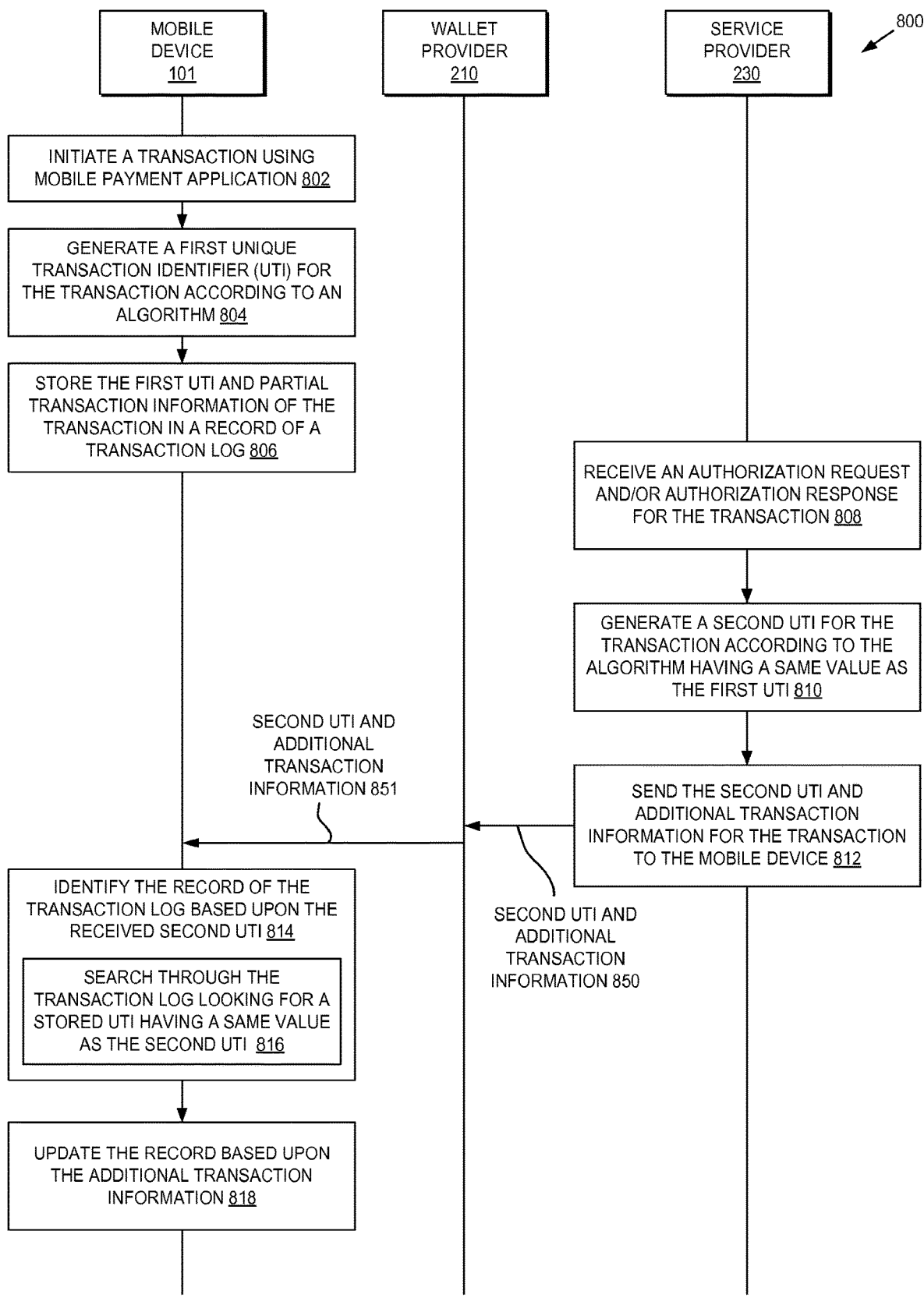
FIG. 8 illustrates a combined sequence and flow diagram depicting the use of unique transaction identifiers for transaction log updates according to some embodiments of the present invention.

To these ends, FIG. 8 illustrates a combined sequence and flow diagram 800 depicting the use of unique transaction identifiers for transaction log updates according to some embodiments of the present invention. The depicted embodiment is directed at providing full transaction information to a transaction log 204 located at a mobile device 101.

For example, at block 802 a transaction is initiated by a mobile device 101 using a payment application. At this point, the mobile device 101 may only have access to partial transaction information. At block 804, the mobile device 101 generates a first unique transaction identifier (UTI) for the transaction according to an algorithm. At block 806, the mobile device 101 stores the first UTI along with the partial transaction information of the transaction in a record of a transaction log 204, which may be stored in "general purpose" memory or in memory only accessible to a secure element 202.

Accordingly, a service provider 230 (e.g., payment processing network 105) server computer 212 receives, at block 808, an authorization request message or authorization response message. The service provider 230, at block 810, generates a second UTI for the transaction according to the algorithm, and the second UTI will have the same value as the first UTI generated by the mobile device 101. The service provider 230 may update the transaction information of the mobile device 101 transaction log 204 by sending transaction matching information (e.g., the second UTI) to the mobile device 101 via messages 850 and 851 with the full transaction information (i.e., thus including "additional" transaction information not yet in the possession of the transaction log 204).

The mobile device 101, at block 814, can identify the record of the transaction log 204 for the transaction based upon the received second UTI. In an embodiment, the mobile device 101 will perform this identification by searching through the transaction log for a record having a stored UTI with a same value as the received second UTI. Upon finding a match, that record is selected as the transaction record, and the mobile device 101 may update the record based upon the additional transaction information at received in the message 851 at block 818. Thus, a service provider 230 may use a shared digest (or index) to generate a unique transaction identifier that both the service provider 230 and the mobile device 101 may use to identify the transaction associated with the transaction matching.

Using a similar scheme, embodiments of the invention also enable mobile devices 101 to report UTIs to the service provider 230. For example, another embodiment allows the service provider 230 to determine merchants with faulty or outdated terminals (e.g., access devices 102) by receiving information regarding unsuccessful transactions attempted by a mobile device 101. Accordingly, when a service provider 230 receives an authorization request messages in a transaction processing system, the server computer may be capable of generating a unique transaction identifier using a hashing algorithm on data elements in the authorization request message and may send the unique transaction identifier to a mobile device. The mobile device 101 may then identify the transaction associated with the received unique transaction identifier and may report any unsuccessful transactions since the last reported transaction to the service provider 230. Therefore, the service provider 230 may be able to determine the number of unsuccessful transactions, the merchants associated with those transactions, and any other relevant information from the transaction log.

VIII. Exemplary Computer Systems

The various participants and elements described herein may operate one or more computer apparatuses to facilitate the functions described herein. Any of the elements in the above-described FIGS. 1-8, including any servers or databases, may use any suitable number of subsystems to facilitate the functions described herein.

Figure 9:
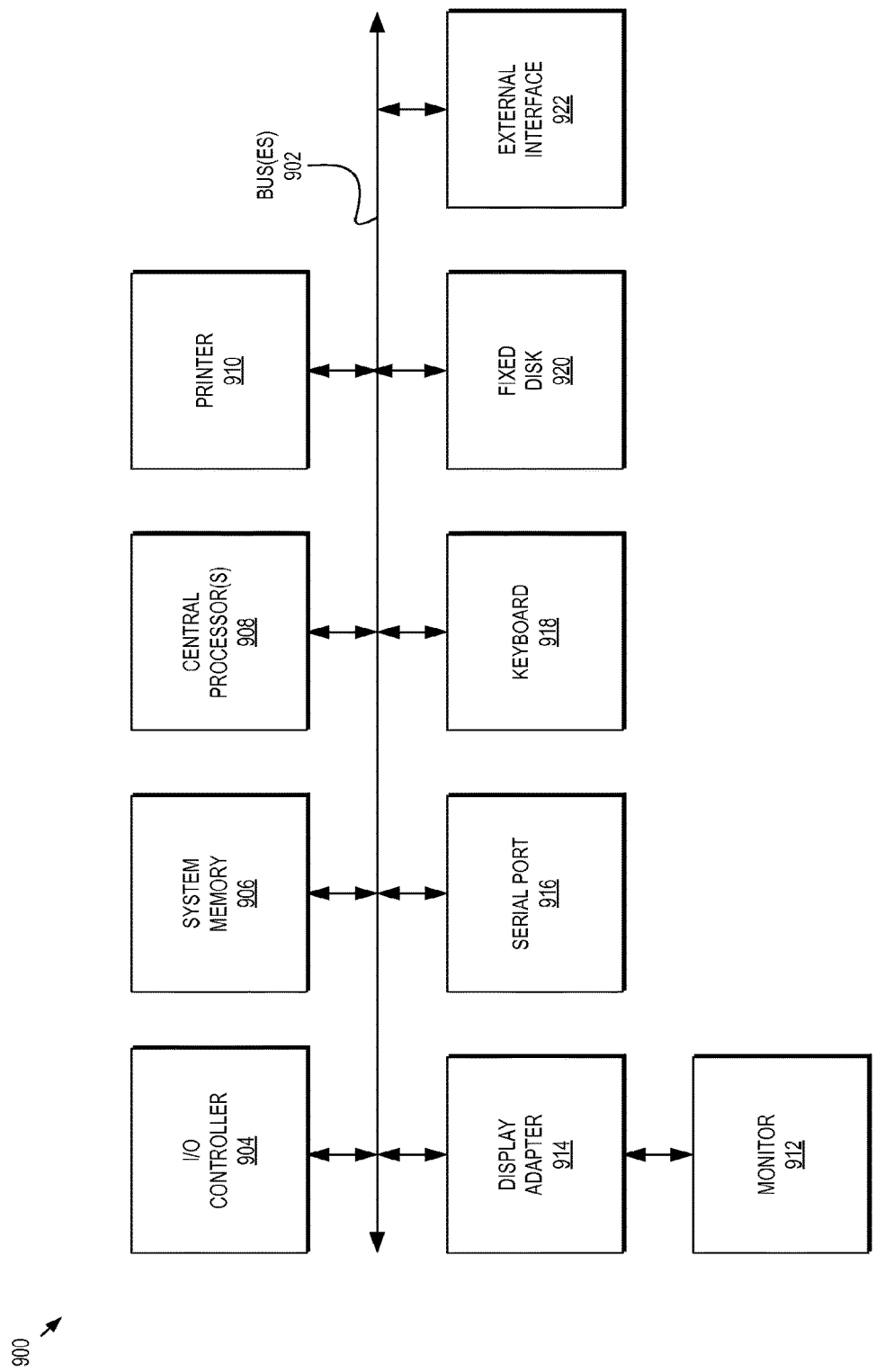
FIG. 9 illustrates a high level block diagram of a computer system that may be used to implement any of the entities or components described herein.

Examples of such subsystems or components are shown in FIG. 9. The subsystems shown in FIG. 9 are interconnected via a system bus 902, which may comprise one or more buses. Additional subsystems such as a printer 910, keyboard 918, fixed disk 920 (or other memory comprising computer readable media, which may include a non-transitory computer readable storage medium), monitor 912 (or "display device"), which is coupled to display adapter 914, and others are shown. Peripherals and input/output (I/O) devices, which couple to I/O controller 904 (which can be a processor or other suitable controller), can be connected to the computer system by any number of means known in the art, such as serial port 916 (or USB port, parallel port, etc.). For example, serial port 916 or external interface 922 can be used to connect the computer apparatus to a wide area network (WAN) such as the Internet, a mouse input device, or a scanner. The interconnection via system bus 902 allows the central processor 908 (which may comprise one or more processing units, processor cores, combinations thereof, etc.) to communicate with each subsystem and to control the execution of instructions from system memory 906 or the fixed disk 920, as well as the exchange of information between subsystems. The system memory 906 and/or the fixed disk 920 may embody a computer readable medium such as a non-transitory computer readable storage medium.

Any of the software components or functions described in this application, may be implemented as software code to be executed by a processor using any suitable computer language such as, for example, Java, C++, C, Python, JavaScript, or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method, comprising:
receiving, at a server computer, a first provisioning request from a first mobile device to provision a first credential of a first user to the first mobile device;
determining, by the server computer, a first risk level associated with the first provisioning request;
determining, by the server computer, that the first risk level is within a predetermined risk threshold range;
based on the first risk level being within the predetermined risk threshold range:
  setting, by the server computer, a first token representing the first credential to an inactive state, wherein the first token is configured to switch from the inactive state to an active state based on an authenticated status of the first user;
  generating, by the server computer, a first set of provisioning scripts and an activation script,
  transmitting, by the server computer to the first mobile device, the first set of provisioning scripts and the first token in the inactive state inaccessible to the first mobile device,
  wherein the first set of provisioning scripts, when executed on the first mobile device, set a protection flag associated with the first token in a memory of the first mobile device, the protection flag representing the inactive state of the first token, and
  the activation script, when executed on the first mobile device, disables the protection flag associated with the first token;
performing, by the server computer, an authentication process with the first user based on direct or indirect communication with the first mobile device;
determining, by the server computer, that the authentication process is successfully performed;
based on a successful performance of the authentication process, transmitting, by the server computer to the first mobile device, the activation script, wherein the activation script modifies a status of the first token from the inactive state to the active state based on the authenticated status of the first user;
receiving, at the server computer, a second provisioning request from a second mobile device to provision a second credential of a second user to the second mobile device;
determining, by the server computer, a second risk level associated with the second provisioning request;
determining, by the server computer, that the second risk level is below the predetermined risk threshold range;
based on the second risk level being below the predetermined risk threshold range:
  setting, by the server computer, a second token representing the second credential to the active state without requiring the authentication process with the second user; and
  transmitting, by the server computer, a second set of provisioning scripts and the second token in the active state to the second mobile device.

2. The method of claim 1, wherein:
receiving, at the server computer, a third provisioning request to provision a third credential to a third mobile device;
determining a third risk level associated with the third provisioning request;
determining that the third risk level meets or exceeds the predetermined risk threshold range;
  based on the third risk level being meeting or exceeding the predetermined risk threshold range:

determining, by the server computer, that the third provisioning request is denied; and
transmitting, by the server computer to the third mobile device, a provisioning request denial message indicating that the third provisioning request is denied.

3. The method of claim 1, wherein:
the performing the authentication process with the first user comprises providing a dynamic verification value to the first user; and
the successful performance of the authentication process comprises receiving, at the server computer, a consumer verification response that includes the dynamic verification value.

4. The method of claim 3, wherein providing the dynamic verification value to the first user comprises:
providing the dynamic verification value to the first user through an issuer of a first account associated with the first credential by:
generating, by the server computer, the dynamic verification value; and
transmitting, by the server computer, the dynamic verification value to an issuer computer of the issuer to cause the issuer to provide the dynamic verification value to the first user.

5. The method of claim 3, wherein:
receiving, at the server computer, a message transmitted by an issuer computer of an issuer of a first account associated with the first credential, wherein the message includes the dynamic verification value; and
comparing, by the server computer, the dynamic verification value of the consumer verification response with a stored copy of the dynamic verification value received from the issuer computer,
wherein said providing the dynamic verification value to the first user comprises transmitting, by the server computer to the issuer computer, a request for the dynamic verification value.

6. The method of claim 3, wherein:
determining, by the server computer, whether the dynamic verification value of the consumer verification response has a same value as an output of a validation algorithm utilizing at least two input values, wherein the at least two input values comprise the first credential and a time value,
wherein said providing the dynamic verification value to the first user comprises transmitting, by the server computer, a request to an issuer computer of an issuer of a first account associated with the first credential for the dynamic verification value to be generated and provided to the first user.

7. The method of claim 1, further comprising:
generating a set of consumer-specific encryption keys;
providing at least one of the set of consumer-specific encryption keys to the first mobile device;
encrypting a communication message using one of the set of consumer-specific encryption keys to yield an encrypted communication message; and
transmitting the encrypted communication message to a wallet application provider, wherein the wallet application provider provides the encrypted communication message to the first mobile device without having access to any of the set of consumer-specific encryption keys.

8. The method of claim 1, further comprising:
receiving, at the server computer, an authorization request message for a first financial transaction;
generating, by the server computer, a unique transaction identifier for the first financial transaction; and
transmitting, by the server computer, the unique transaction identifier and additional transaction information for the first financial transaction to the first mobile device.

9. The method of claim 1, wherein the first provisioning request excludes a primary account number (PAN) of a first account associated with the first credential, and includes a reference identifier of the PAN, and wherein the method further comprises identifying, by the server computer, the first account using the reference identifier.

10. A server computer comprising:
one or more processors; and
a non-transitory computer readable storage medium communicatively coupled with the one or more processors and storing instructions which, when executed by the one or more processors, cause the server computer to perform operations comprising:
receiving a first provisioning request from a first mobile device to provision a first credential of a first user to the first mobile device;
determining a first risk level associated with the first provisioning request;
determining that the first risk level is within a predetermined risk threshold range;
based on the first risk level being within the predetermined risk threshold range:
setting a first token representing the first credential to an inactive state, wherein the first token is configured to switch from the inactive state to an active state based on an authenticated status of the first user;
generating a first set of provisioning scripts and an activation script,
transmitting, to the first mobile device, the first set of provisioning scripts and the first token in the inactive state inaccessible to the first mobile device,
wherein the first set of provisioning scripts, when executed on the first mobile device, set a protection flag associated with the first token in a memory of the first mobile device, the protection flag representing the inactive state of the first token, and
the activation script, when executed on the first mobile device, disables the protection flag associated with the first token;
performing an authentication process with the first user based on direct or indirect communication with the first mobile device;
determining that the authentication process is successfully performed;
based on a successful performance of the authentication process, transmitting, to the first mobile device, the activation script, wherein the activation script modifies a status of the first token from the inactive state to the active state based on the authenticated status of the first user;
receiving a second provisioning request from a second mobile device to provision a second credential of a second user to the second mobile device;
determining a second risk level associated with the second provisioning request;
determining that the second risk level is below the predetermined risk threshold range;

based on the second risk level being below the predetermined risk threshold range:
setting a second token representing the second credential to the active state without requiring the authentication process with the second user; and
transmitting a second set of provisioning scripts and the second token in the active state to the second mobile device.

11. The server computer of claim 10, wherein the instructions, when executed by the one or more processors, further cause the server computer to perform operations comprising:
receiving a third provisioning request to provision a third credential to a third mobile device;
determining a third risk level associated with the third provisioning request;
determining that the third risk level meets or exceeds the predetermined risk threshold range; and
transmitting, to the third mobile device, a provisioning request denial message indicating that the third provisioning request is denied.

12. The server computer of claim 10, wherein the instructions, when executed by the one or more processors, further cause the server computer to perform operations comprising:
obtaining a dynamic verification value;
storing the dynamic verification value;
providing the dynamic verification value to the first user;
receiving a consumer verification response that includes the dynamic verification value; and
comparing the dynamic verification value of the consumer verification response with a stored copy of the dynamic verification value.

13. The server computer of claim 12, wherein obtaining the dynamic verification value includes generating the dynamic verification value.

14. The server computer of claim 12, wherein obtaining the dynamic verification value includes:
transmitting, to an issuer computer of an issuer of a first account associated with the first credential, a request for the dynamic verification value; and
receiving the dynamic verification value from the issuer computer.

15. The server computer of claim 10, wherein the first set of provisioning scripts include a personalization script that, when executed on the first mobile device, store personalization data onto the first mobile device.

16. The server computer of claim 15, wherein the first set of provisioning scripts include a deletion script that, when executed on the first mobile device, deletes or otherwise removes the personalization data from the first mobile device.

17. The server computer of claim 10, wherein the first provisioning request or the second provisioning request includes one or more of an identifier for the first mobile device or the second mobile device, respectively, a primary account number (PAN) associated with account attempting to be provisioned, an expiration date, a verification value, or a time-sensitive token that expires after a predetermined period of time.

18. The server computer of claim 10, wherein the first risk level or the second risk level is determined based on one or more rules provided by an issuer of the first credential or the second credential, respectively.

* * * * *